United States Patent
Davis, Jr.

(10) Patent No.: US 12,215,514 B2
(45) Date of Patent: Feb. 4, 2025

(54) HARD SHELL ROOFTOP TENT FRAME AND EXTERIOR ASSEMBLY AND METHOD

(71) Applicant: Hotbodies Racing, Inc., Poway, CA (US)

(72) Inventor: Roger George Lee Davis, Jr., Poway, CA (US)

(73) Assignee: Hotbodies Racing, Inc., Poway, CA (US)

( * ) Notice: Subject to any disclaimer, the term of this patent is extended or adjusted under 35 U.S.C. 154(b) by 0 days.

(21) Appl. No.: 18/397,775

(22) Filed: Dec. 27, 2023

(65) Prior Publication Data
US 2024/0175287 A1 May 30, 2024

Related U.S. Application Data

(63) Continuation of application No. 17/588,837, filed on Jan. 31, 2022, now Pat. No. 11,920,364.

(60) Provisional application No. 63/144,828, filed on Feb. 2, 2021.

(51) Int. Cl.
*E04H 15/06* (2006.01)
*E04H 15/00* (2006.01)

(52) U.S. Cl.
CPC .......... *E04H 15/008* (2013.01); *E04H 15/06* (2013.01)

(58) Field of Classification Search
CPC .......... E04H 15/06; E04H 15/008; B60P 3/38
See application file for complete search history.

(56) References Cited

U.S. PATENT DOCUMENTS

| | | | |
|---|---|---|---|
| 3,202,457 A | 8/1965 | Wiley | |
| 3,377,100 A | 4/1968 | Cripe | |
| 4,884,376 A | 12/1989 | DeBlock et al. | |
| 5,803,011 A | 9/1998 | Tatsumi | |
| 9,815,359 B2 | 11/2017 | Morazan | |
| 11,130,437 B1 | 9/2021 | Tatro | |
| 11,203,279 B1 * | 12/2021 | Tatro | E04H 15/48 |
| 2010/0263698 A1 | 10/2010 | Chiu | |
| 2016/0288635 A1 * | 10/2016 | Morazan | B60J 11/04 |

OTHER PUBLICATIONS

Cristian Curmei, "Convoy Rooftop Tent Shows You the World with a Full Moonroof and 360-Degree View" Dec. 23, 2021. https://www.autoevolution.com/news/convoy-rooftop-tent-shows-you-the-world-with-a-full-moonroof-and-360-degree-view-177711.html (Year: 2021).

* cited by examiner

*Primary Examiner* — Noah Chandler Hawk
(74) *Attorney, Agent, or Firm* — Procopio, Cory, Hargreaves & Savitch LLP

(57) ABSTRACT

A method of transporting a rooftop tent frame and exterior assembly for a rooftop or truck bed of a vehicle to a customer, the assembly including one or more frame assemblies; a roof supported by the one or more frame assemblies and positionable between a retracted position where the roof is adjacent to the rooftop of the vehicle, and a deployed camping position where at least part of the roof is elevated relative to the rooftop of the vehicle, wherein the one or more frame assemblies and the roof are modular components, the method including inserting all of assembly including the modular components of the assembly into one or more shipping boxes, each no greater than 20,736 cubic inches in volume; shipping the one or more boxes with all of the assembly including the modular components to the customer via a shipping carrier.

13 Claims, 37 Drawing Sheets

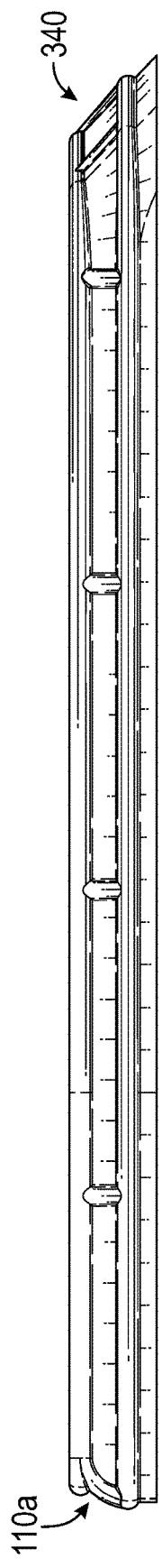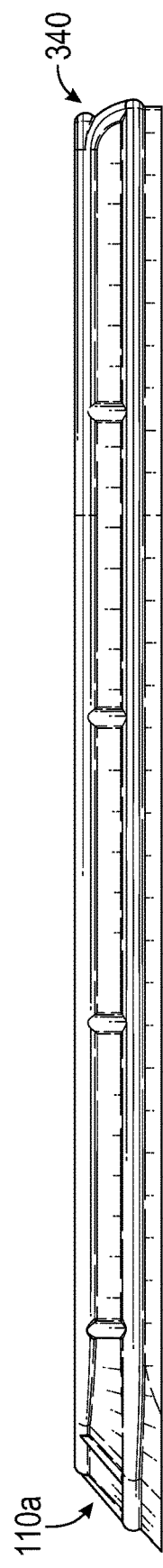

HARD SHELL ROOFTOP TENT FRAME AND EXTERIOR ASSEMBLY AND METHOD

CROSS-REFERENCE TO RELATED APPLICATIONS

This application is a continuation of U.S. patent application Ser. No. 17/588,837, filed Jan. 31, 2022, which claims the benefit of U.S. Provisional Patent Application No. 63/144,828, filed Feb. 2, 2021, under 35 U.S.C. 119. All of these applications are incorporated by reference herein.

FIELD OF THE INVENTION

The present invention relates to rooftop tents, truck bed tents, and particularly to rooftop tent frame and exterior assemblies.

BACKGROUND OF THE INVENTION

Rooftop tent frame and exterior assemblies include and/or enclose a rooftop tent, which is deployed on top of a vehicle such as sport utility vehicle for camping purposes. Problems with these rooftop tent frame and exterior assembly and/or rooftop tents are they tend to be bulky and spaced vertically upward from a rooftop of a vehicle. This increases wind resistance and drag of vehicle during driving, reducing the fuel efficiency of the vehicle. Another problem with these rooftop tent frame and exterior assemblies and/or rooftop tents that come in large sections or members is that they have a single plastic or fiberglass top and bottom that clamshell together when closed. As a result, for shipping purposes, these rooftop tent frame and exterior assemblies and/or rooftop tents had to ship by freight truck, not small parcel delivery like Fedex, UPS, etc. (i.e., standard delivery carriers). These rooftop tent frame and exterior assemblies and/or rooftop tents, because they are single-piece and bulky, occupy a lot of warehouse storage space, making storage cost great. A further problem is that because these rooftop tent frame and exterior assemblies and/or rooftop tents are so big and bulky that they clearly identify the rooftop tent frame and exterior assembly as a hard-shell tent.

SUMMARY OF THE INVENTION

A slim rooftop and/or truck bed collapsible tent frame and exterior assembly and/or rooftop tent made of plastic, aluminum, composite, or fiberglass material with an aerodynamic design that matches the roof line of the vehicle without modification to nor removal of the roof and when closed does not appear to be a hard-shell tent. The rooftop tent frame and exterior assembly may be installed or removed without modification to vehicle. The rooftop tent frame and exterior assembly may incorporate a standard soft tent wall version panned and hard wall version. The rooftop tent frame and exterior assembly includes front, rear, side panels, and top panels that assemble on a frame that is in contact with the vehicle's roof/roof line, creating a seamless appearance that allows for better aerodynamics and styling specific to each application. The rooftop tent frame and exterior assembly conceals the tent components seamlessly on the roof of the vehicle. The top panels of the rooftop tent frame and exterior assembly also form a hard-shell moon roof for the rooftop tent. The rooftop tent frame and exterior assembly and tent are a modular assembly that ships to the consumer in a box via standard delivery carriers such as Fedex, UPS, etc.

An aspect of the invention involves a vehicle rooftop tent frame and exterior assembly for a rooftop or truck bed of a vehicle comprises one or more frame assemblies; a moon roof supported by the one or more frame assemblies and positionable between a retracted position where the moon roof is adjacent to the rooftop of the vehicle, and a deployed camping position where at least part of the moon is elevated relative to the rooftop of the vehicle, wherein the rooftop tent frame and exterior assembly is configured to contact the rooftop of the vehicle.

One or more implementations of the aspect of the invention described immediately above includes one or more of the following: the rooftop tent frame and exterior assembly has a slim aerodynamic design that matches a roof line the vehicle without modification to or removal of the roof; the rooftop tent frame and exterior assembly includes one of a soft wall tent and a hard wall tent; the rooftop tent frame and exterior assembly is configured to contact the rooftop, without a roof rack between the rooftop tent frame and exterior assembly and the rooftop; the moonroof includes one or more rigid translucent panels; the moonroof includes one or more rigid translucent dark smoke panels; the one or more frame assemblies include a top frame assembly that supports the moonroof; and/or the rooftop tent frame and exterior assembly includes flooring and the one or more frame assemblies include a bottom frame assembly that supports the flooring.

Another aspect of the invention involves a method of using a vehicle rooftop tent frame and exterior assembly, the rooftop tent frame and exterior assembly including one or more frame assemblies; a moon roof supported by the one or more frame assemblies and positionable between a retracted position where the moon roof is adjacent to the rooftop of the vehicle, and a deployed camping position where at least part of the moon is elevated relative to the rooftop of the vehicle, comprising positioning the moon roof in the retracted position where the moon roof is adjacent to the rooftop of the vehicle; positioning the moon roof in the deployed camping position where at least part of the moon is elevated relative to the rooftop of the vehicle during camping; contacting the rooftop of the vehicle with the rooftop tent frame and exterior assembly during the positioning steps. The method may further include, while lying on one's back under the moon roof, looking up through the moon roof.

A further aspect of the invention involves a method of transporting a rooftop tent frame and exterior assembly, the rooftop tent frame and exterior assembly including one or more frame assemblies, the one or more frame assemblies and the moon roof being modular components; a moon roof supported by the one or more frame assemblies and positionable between a retracted position where the moon roof is adjacent to the rooftop of the vehicle, and a deployed camping position where at least part of the moon is elevated relative to the rooftop of the vehicle, comprising inserting all of rooftop tent frame and exterior assembly including the modular components of the rooftop tent frame and exterior assembly into one or more shipping boxes, each no greater than 20,736 cubic inches in volume; shipping the one or more boxes with all of rooftop tent frame and exterior assembly including the modular components to the customer via a shipping carrier.

One or more implementations of the aspect of the invention described immediately above includes one or more of the following: receiving by the customer the one or more boxes with all of rooftop tent frame and exterior assembly including the modular components from the shipping carrier; removing all of rooftop tent frame and exterior assembly including the modular components from the one or more boxes by the customer; and/or the one or more shipping boxes each are no greater than 10,944 cubic inches in volume.

BRIEF DESCRIPTION OF DRAWINGS

The accompanying drawings, which are incorporated in and form a part of this specification illustrate embodiments of the invention and together with the description, serve to explain the principles of the invention.

FIG. 22 is a left side elevational view of the rooftop tent frame and exterior assembly.

FIG. 23 is a right side elevational view of the rooftop tent frame and exterior assembly.

DESCRIPTION OF EMBODIMENT OF THE INVENTION

Figure 1:
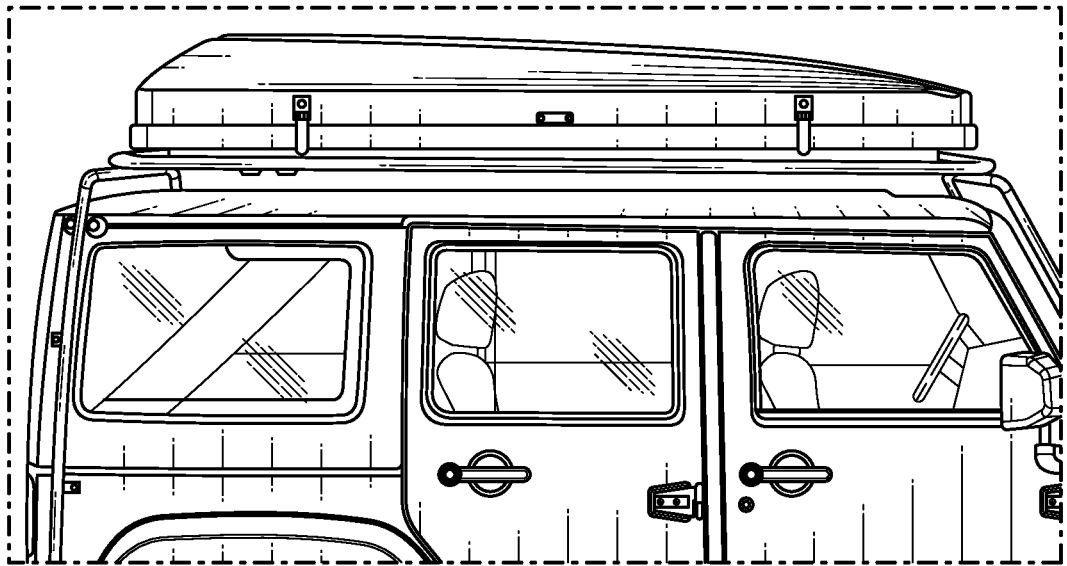
FIG. 1 is a side elevational view of a prior art rooftop tent frame and exterior assembly and/or rooftop tent on a vehicle.
Figure 2:
FIG. 2 is a left side elevational view of a rooftop tent frame and exterior assembly for a rooftop tent in accordance with an embodiment of the invention shown on a vehicle.
Figure 3:
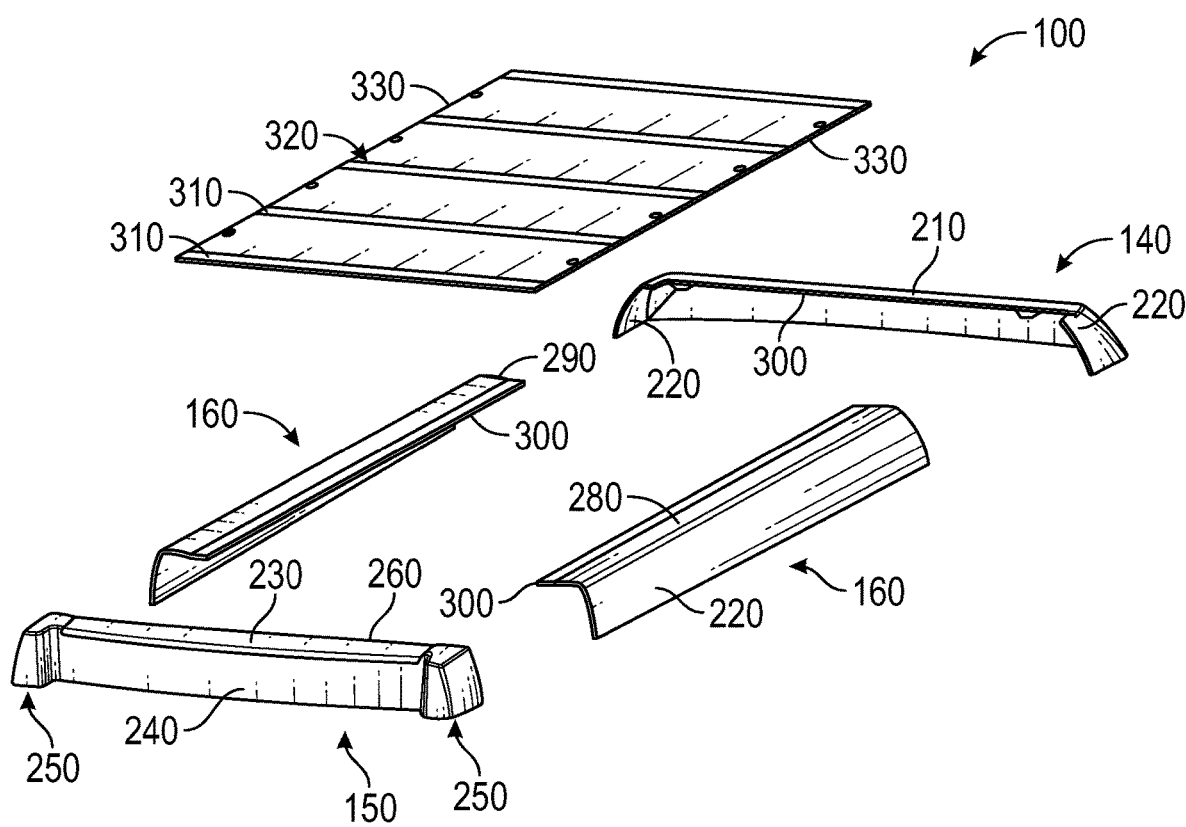
FIG. 3 is an exploded perspective view of the rooftop tent frame and exterior assembly of FIG. 2.
Figure 4:
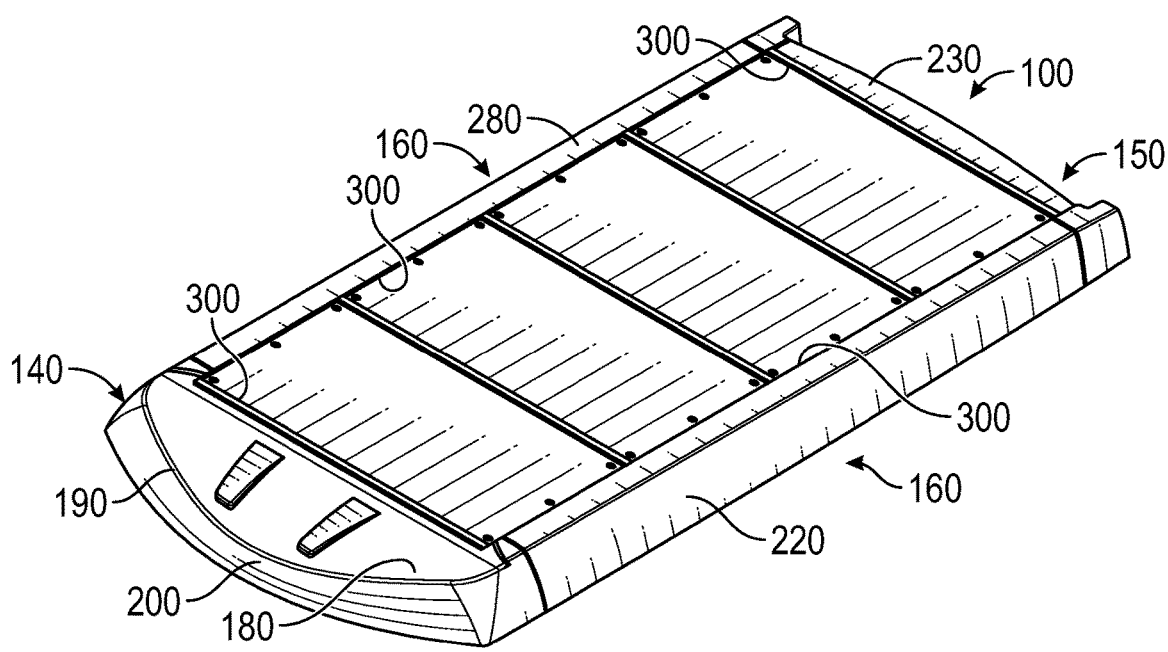
FIG. 4 is a front perspective view of the rooftop tent frame and exterior assembly of FIG. 2.
Figure 5:
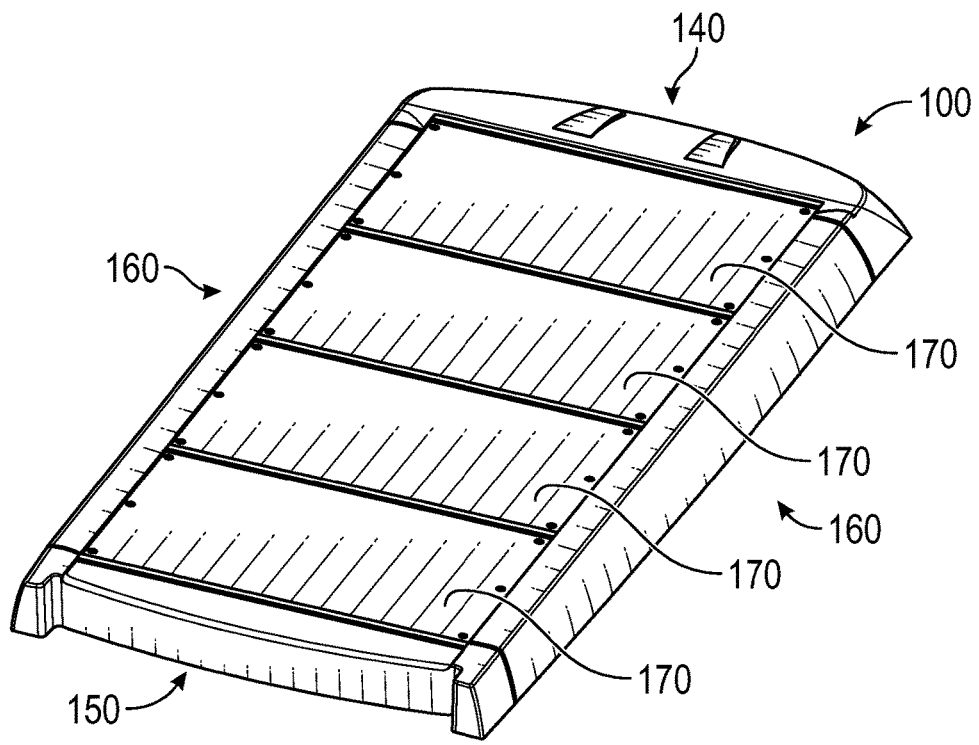
FIG. 5 is a rear perspective view of the rooftop tent frame and exterior assembly of FIG. 2.
Figure 6:
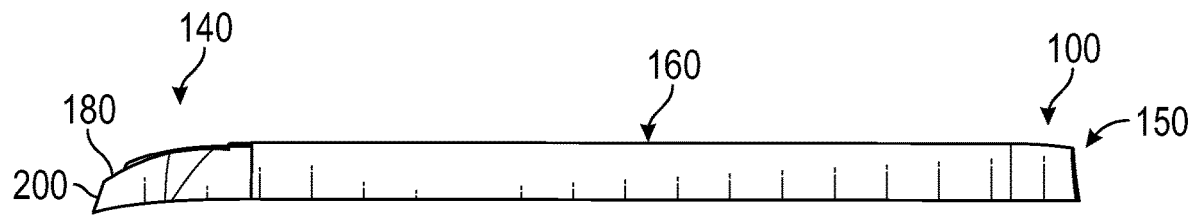
FIG. 6 is a right side elevational view of the rooftop tent frame and exterior assembly.
Figure 7:
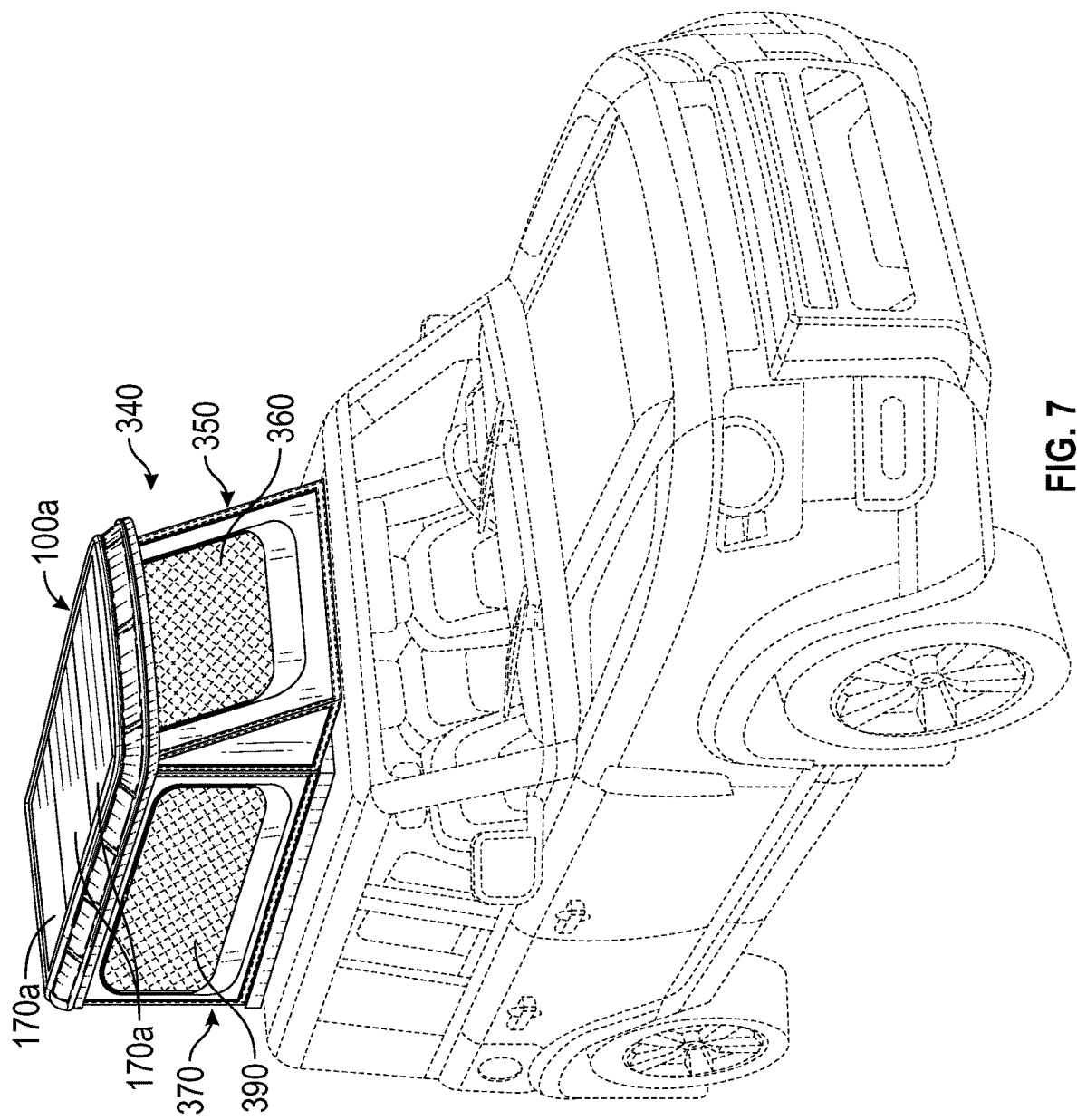
FIG. 7 is a perspective view of an embodiment of a rooftop tent frame and exterior assembly and vehicle rooftop tent shown on a vehicle.
Figure 8:
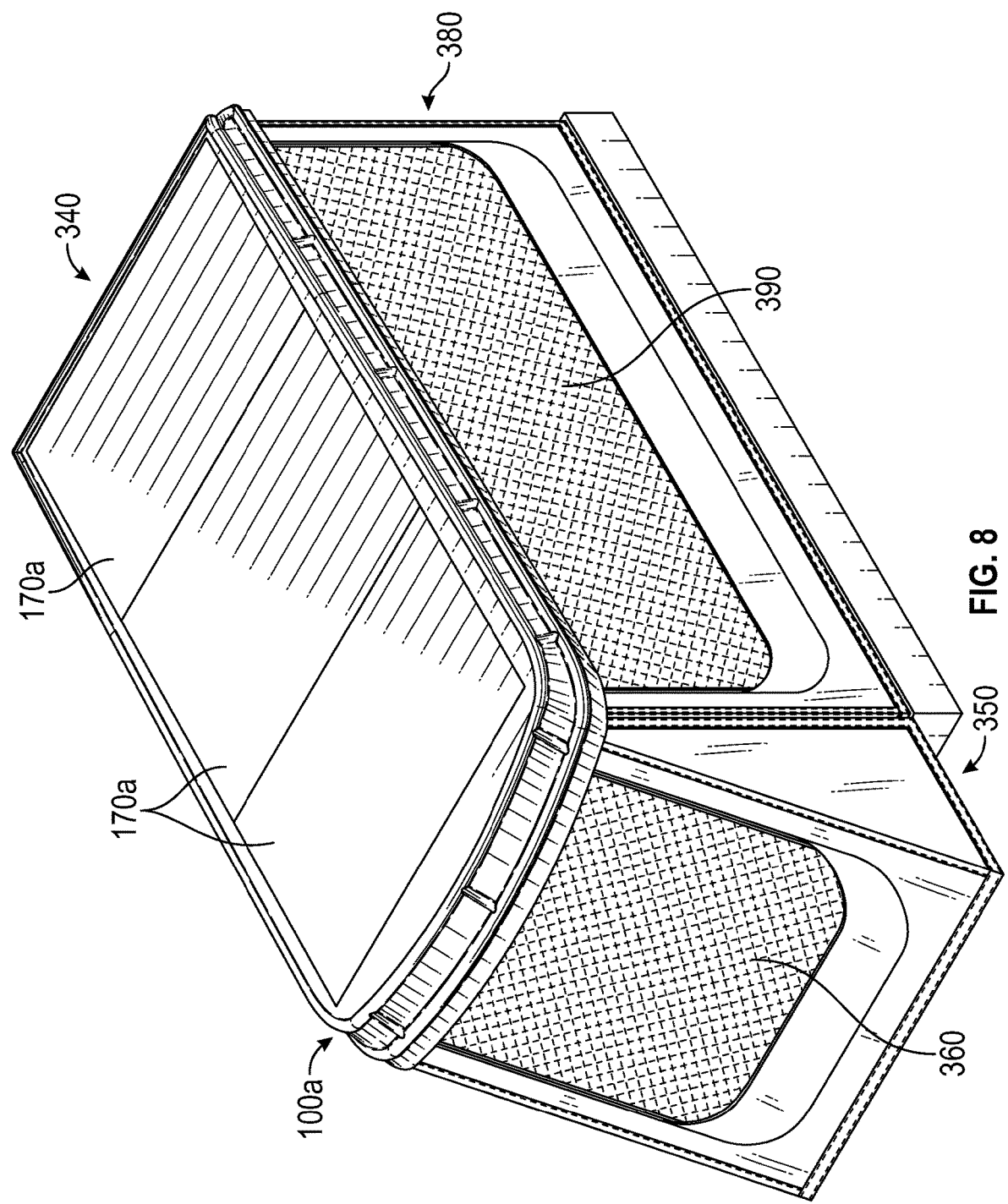
FIG. 8 is another perspective view of the vehicle rooftop tent.
Figure 9:
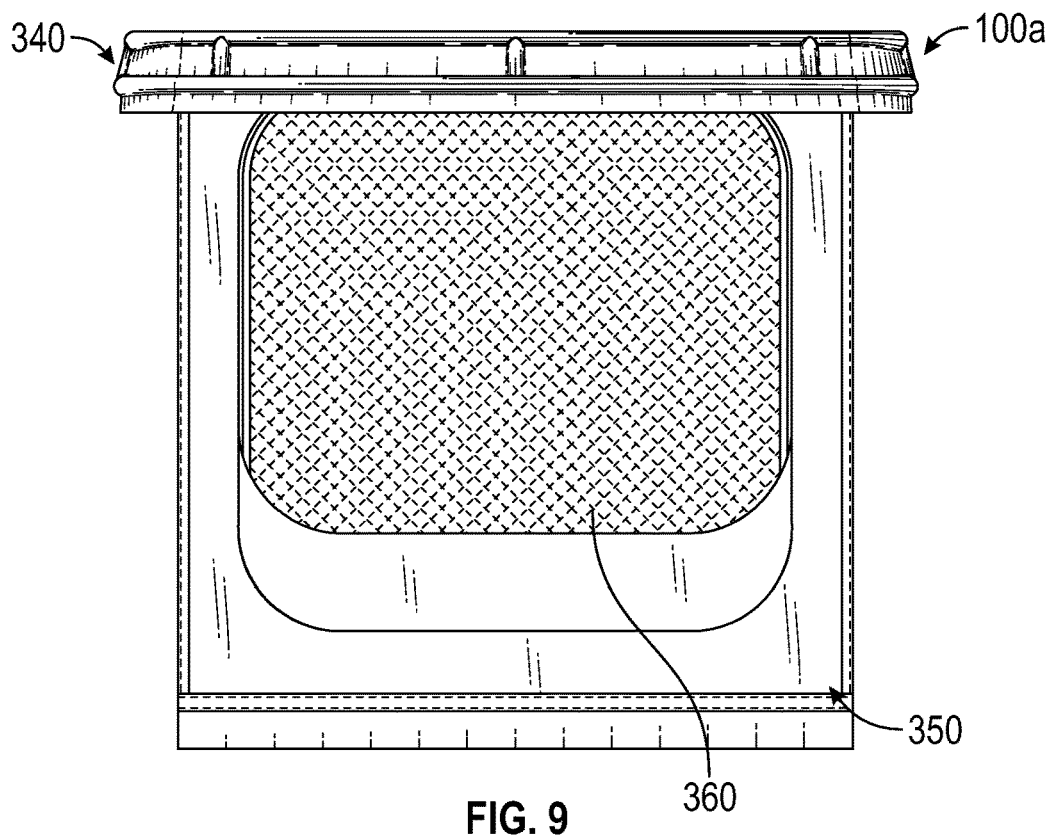
FIG. 9 is a front elevational view of the vehicle rooftop tent.
Figure 10:
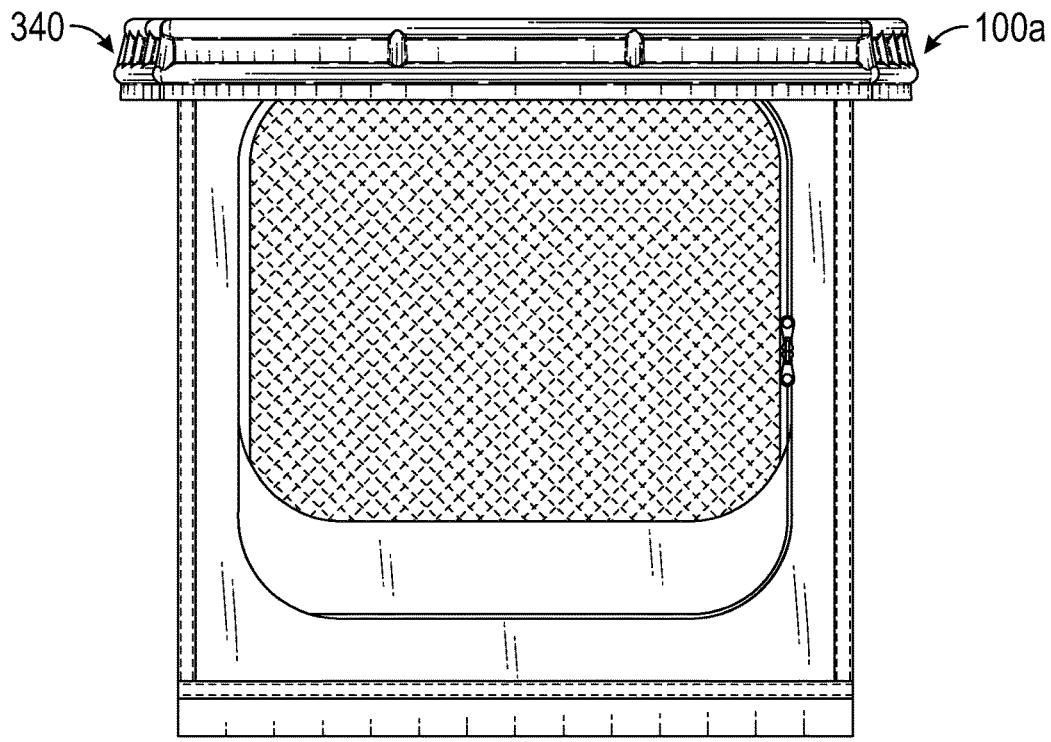
FIG. 10 is a rear elevational view of the vehicle rooftop tent.
Figure 11:
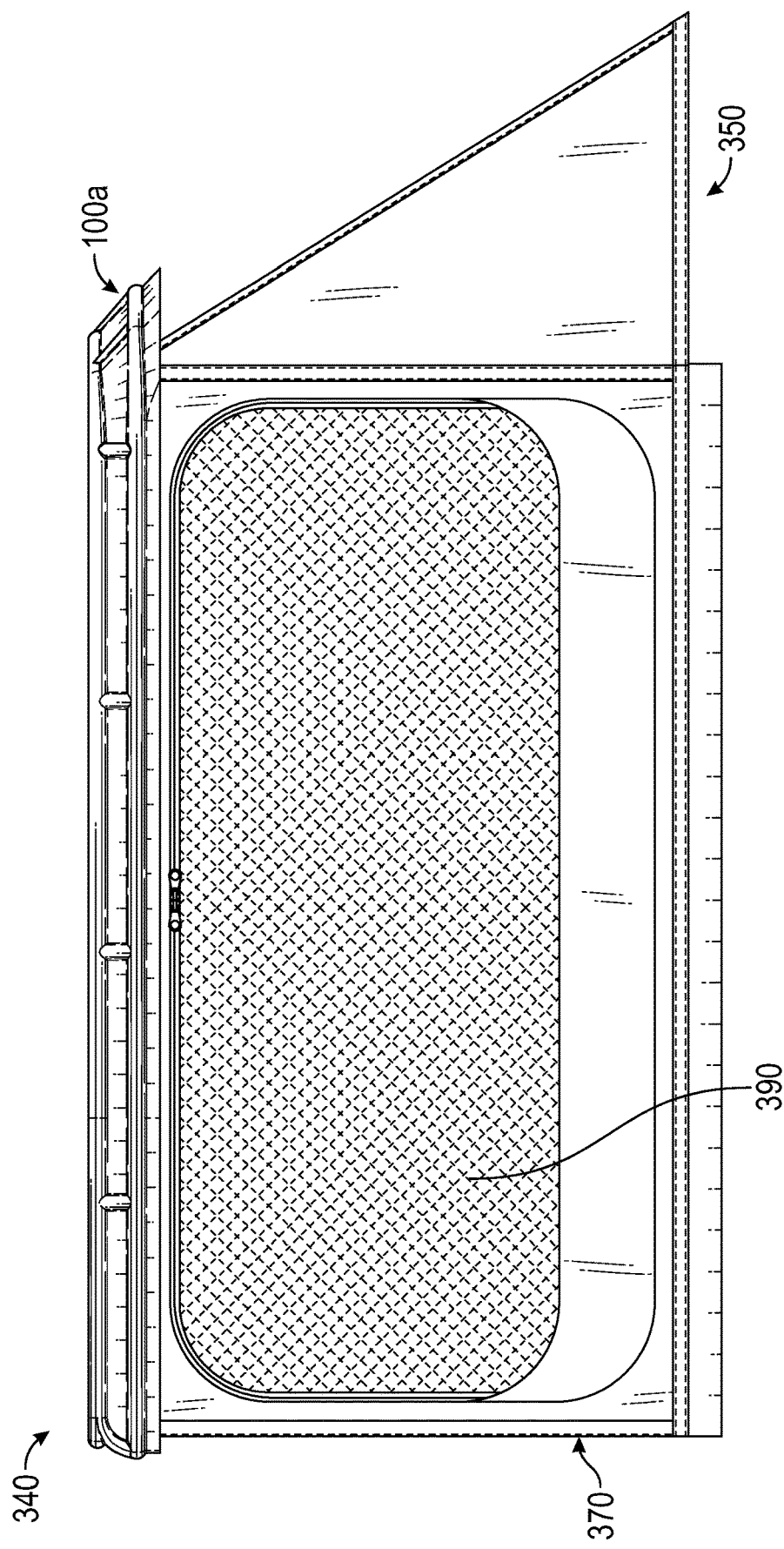
FIG. 11 is a left side elevational view of the vehicle rooftop tent.
Figure 12:
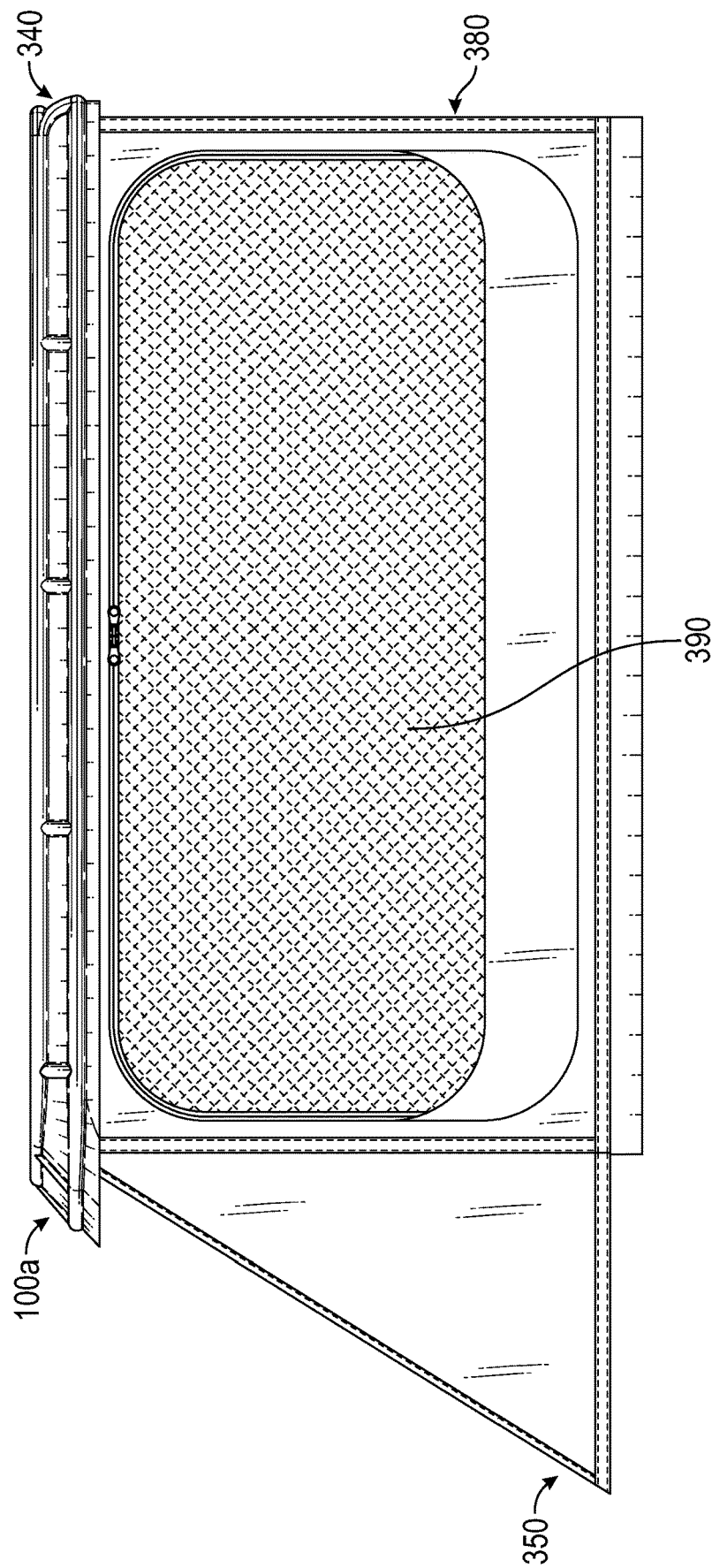
FIG. 12 is a right side elevational view of the vehicle rooftop tent.
Figure 13:
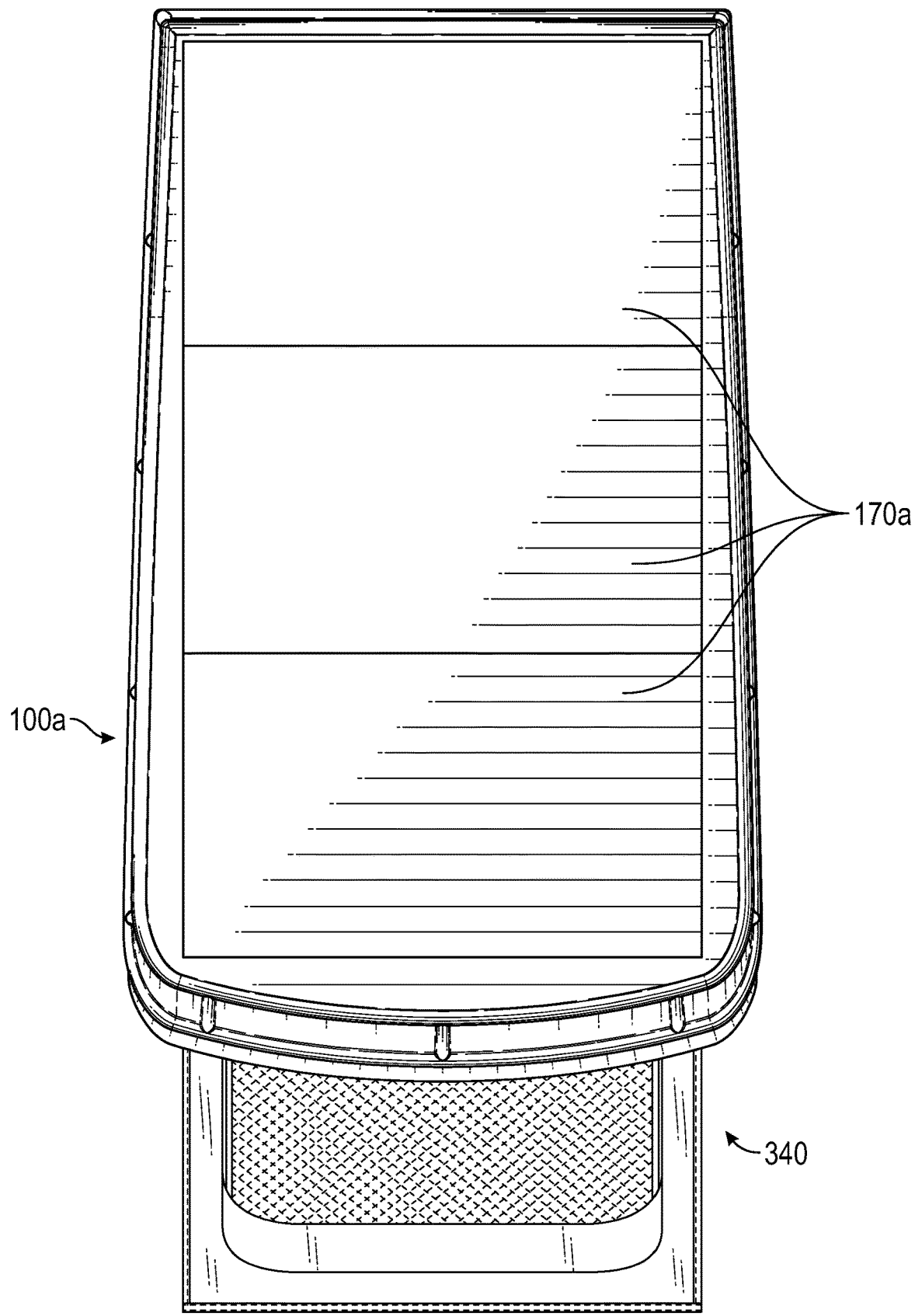
FIG. 13 is a top plan view of the vehicle rooftop tent.
Figure 14:
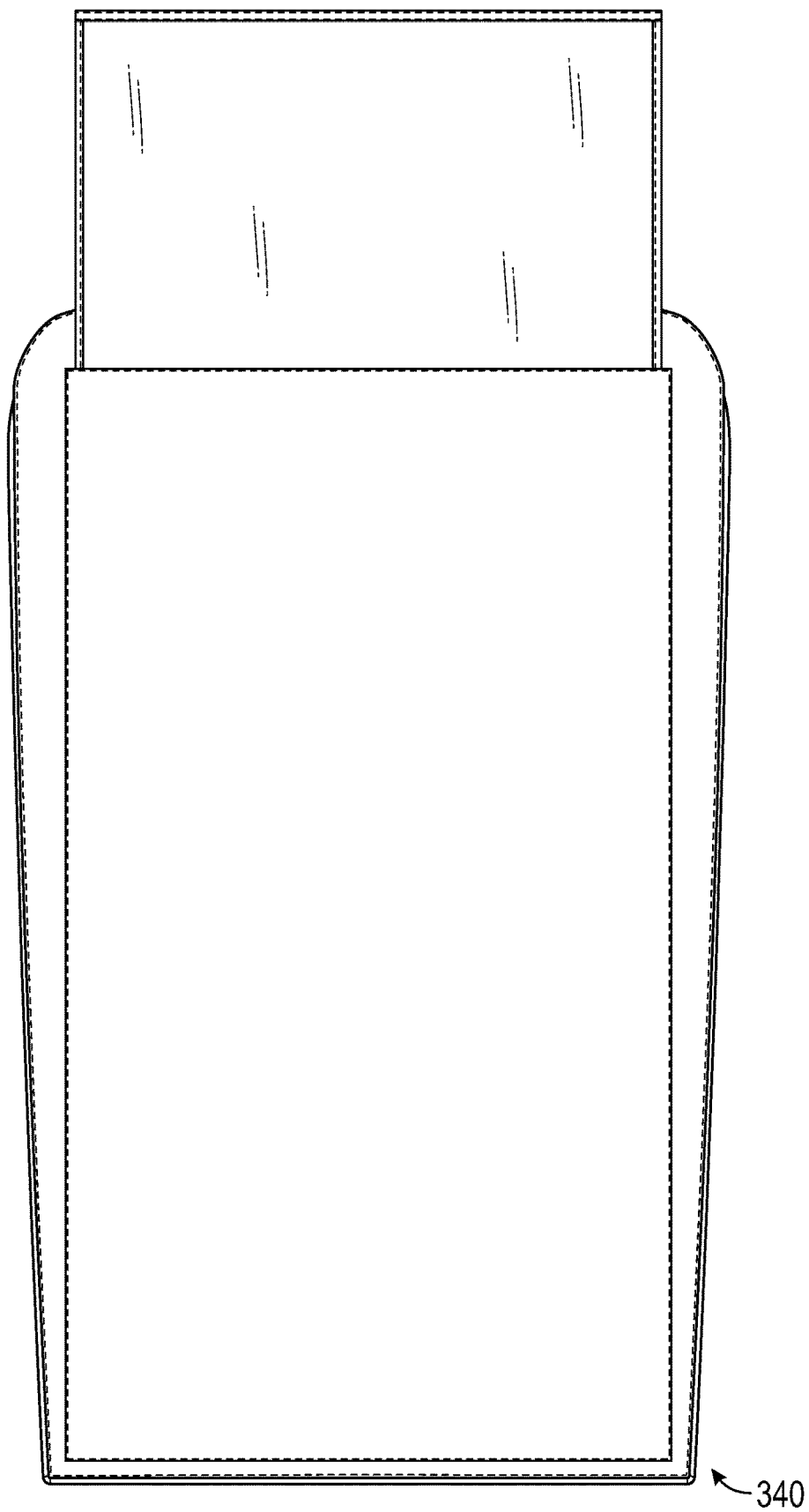
FIG. 14 is a bottom plan view of the vehicle rooftop tent.
Figure 15:
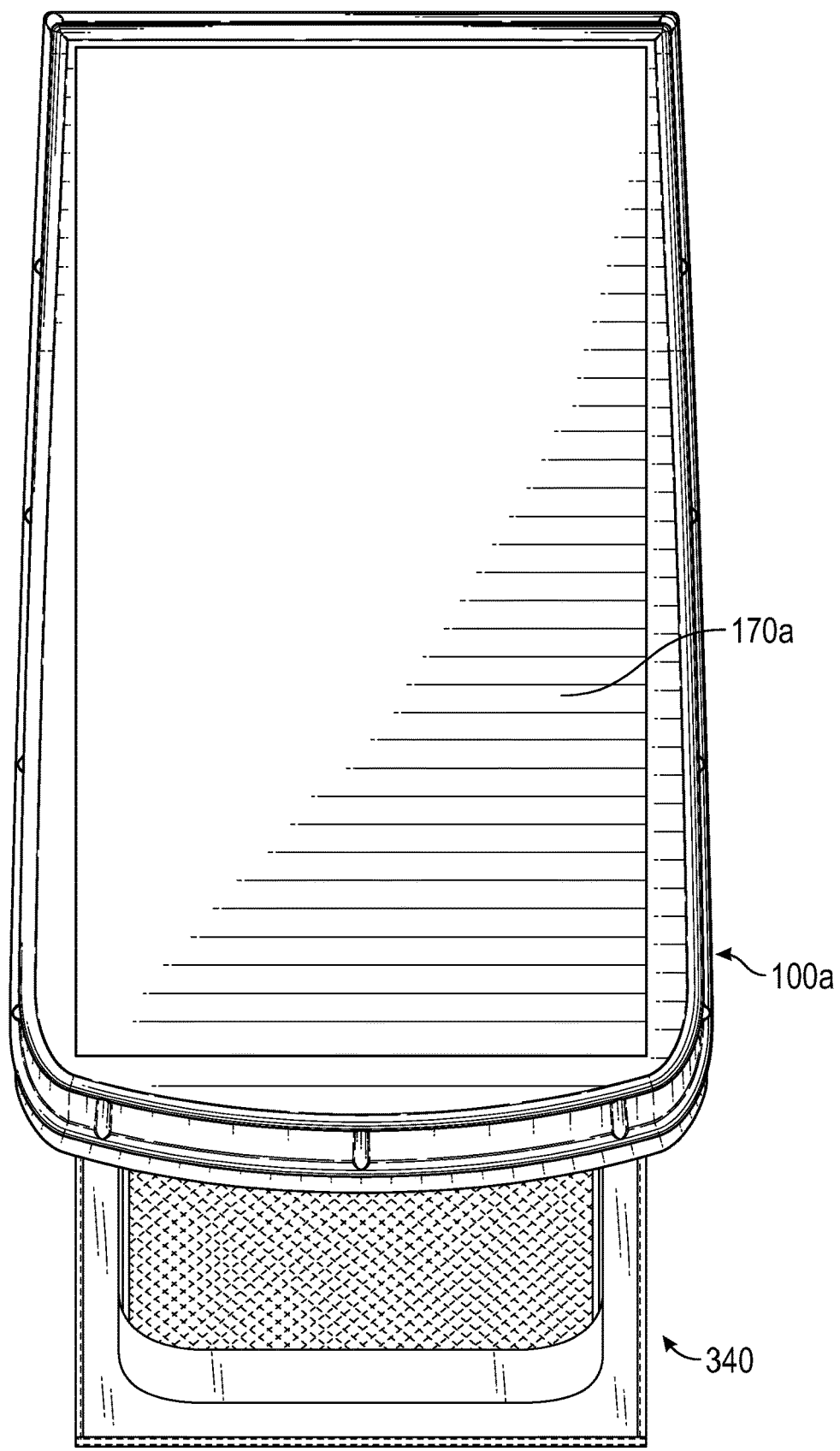
FIG. 15 is top plan view of another embodiment the vehicle rooftop tent, the front elevational view, the rear elevation view, the left side elevational view, the right side elevational view and the bottom plan view being the same as shown in FIGS. 9-12 and 14.
Figure 16:
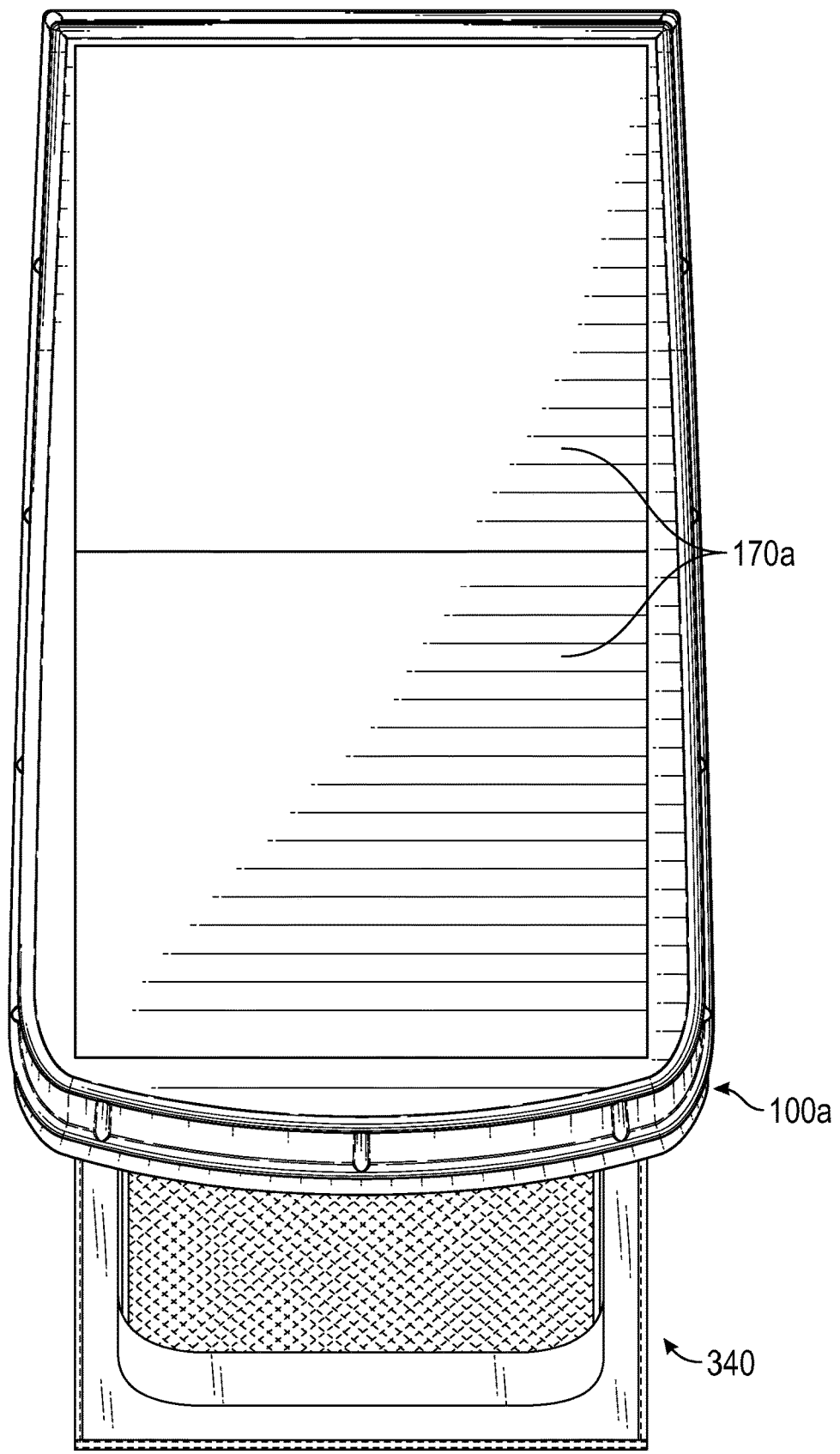
FIG. 16 is top plan view of a further embodiment the vehicle rooftop tent, the front elevational view, the rear elevation view, the left side elevational view, the right side elevational view and the bottom plan view being the same as shown in FIGS. 9-12 and 14.
Figure 17:
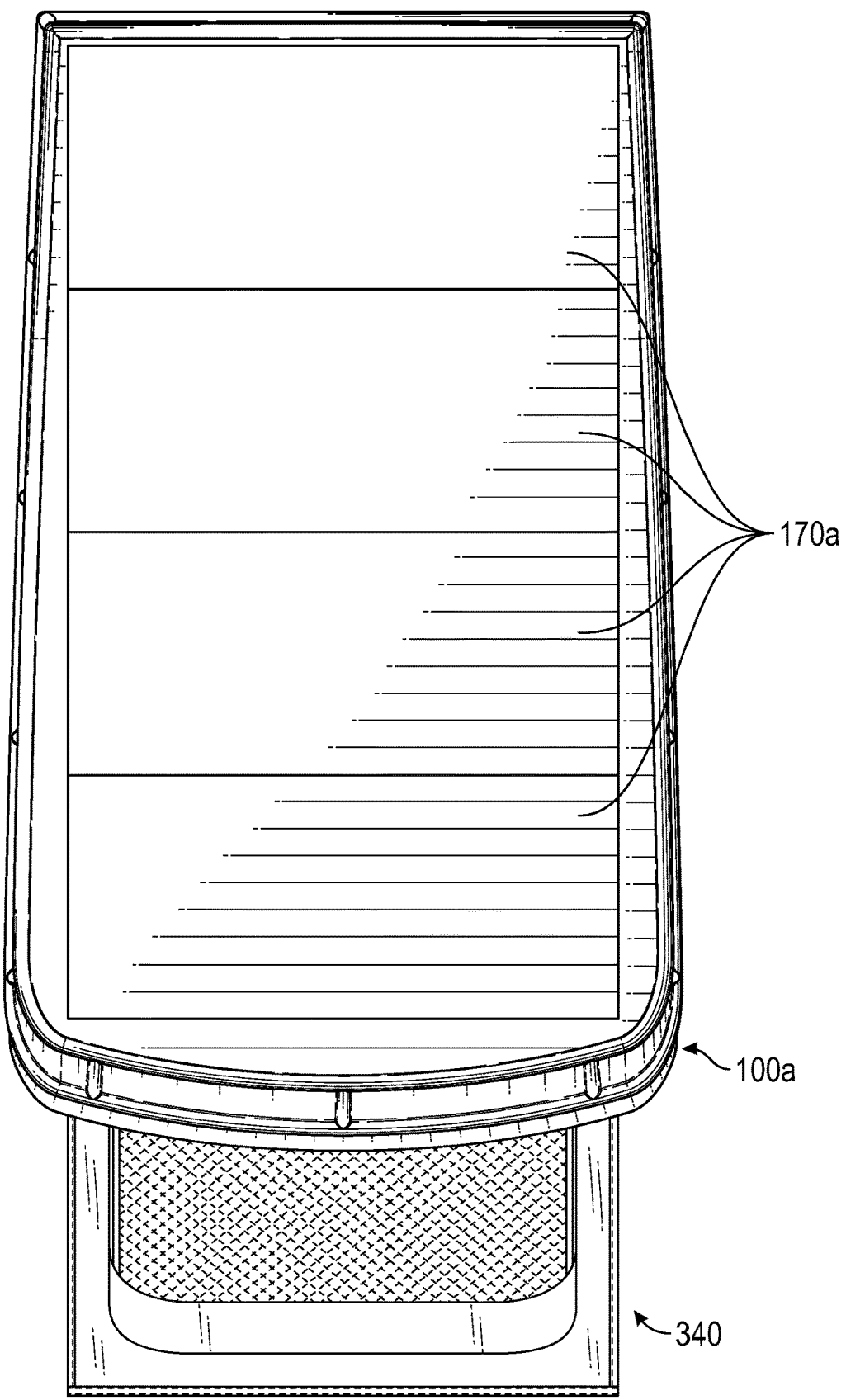
FIG. 17 is top plan view of a further embodiment the vehicle rooftop tent, the front elevational view, the rear elevation view, the left side elevational view, the right side elevational view and the bottom plan view being the same as shown in 9-12 and 14.
Figure 18:
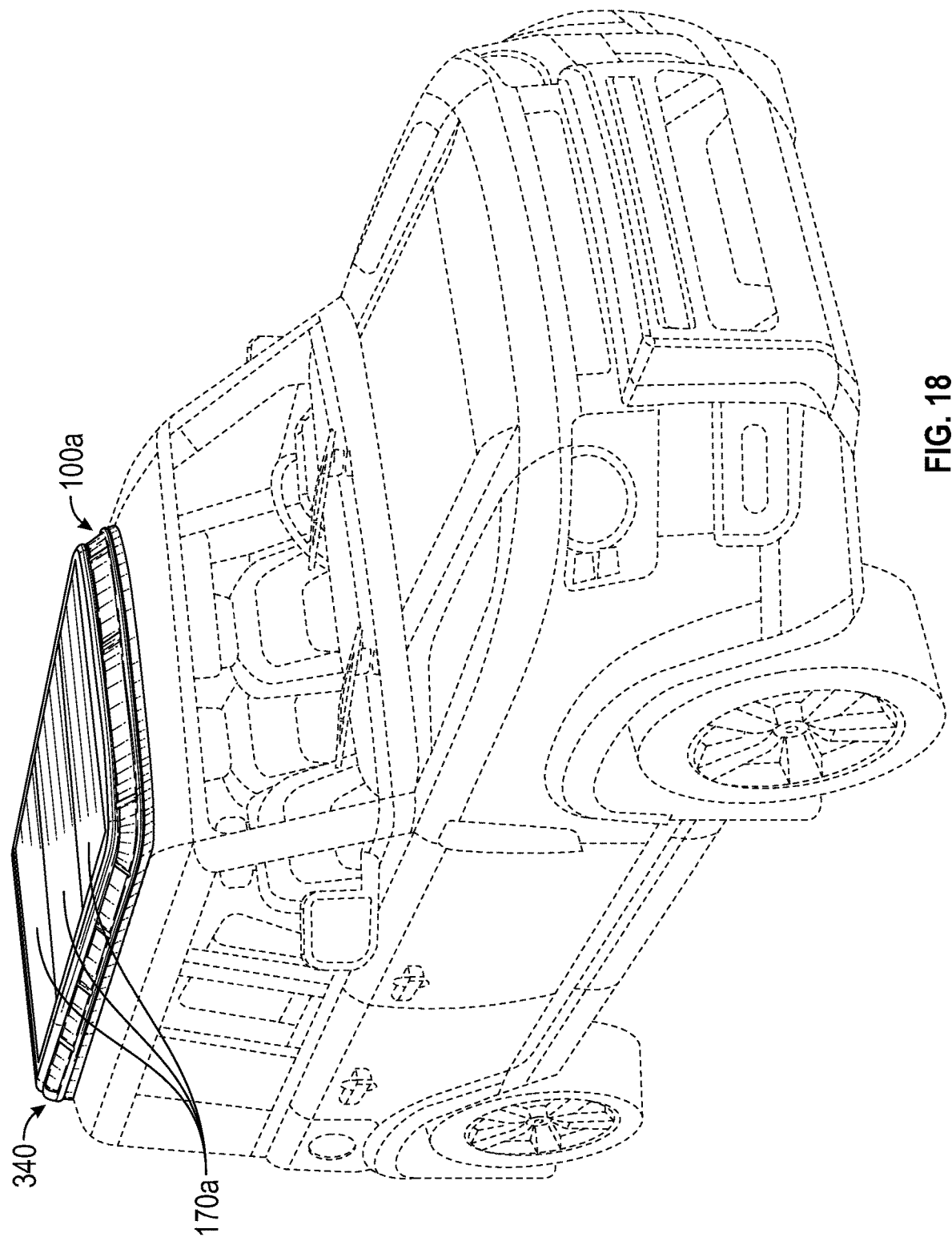
FIG. 18 is a perspective view of an embodiment of a rooftop tent frame and exterior assembly shown on a vehicle and how it contacts the roof.
Figure 19:
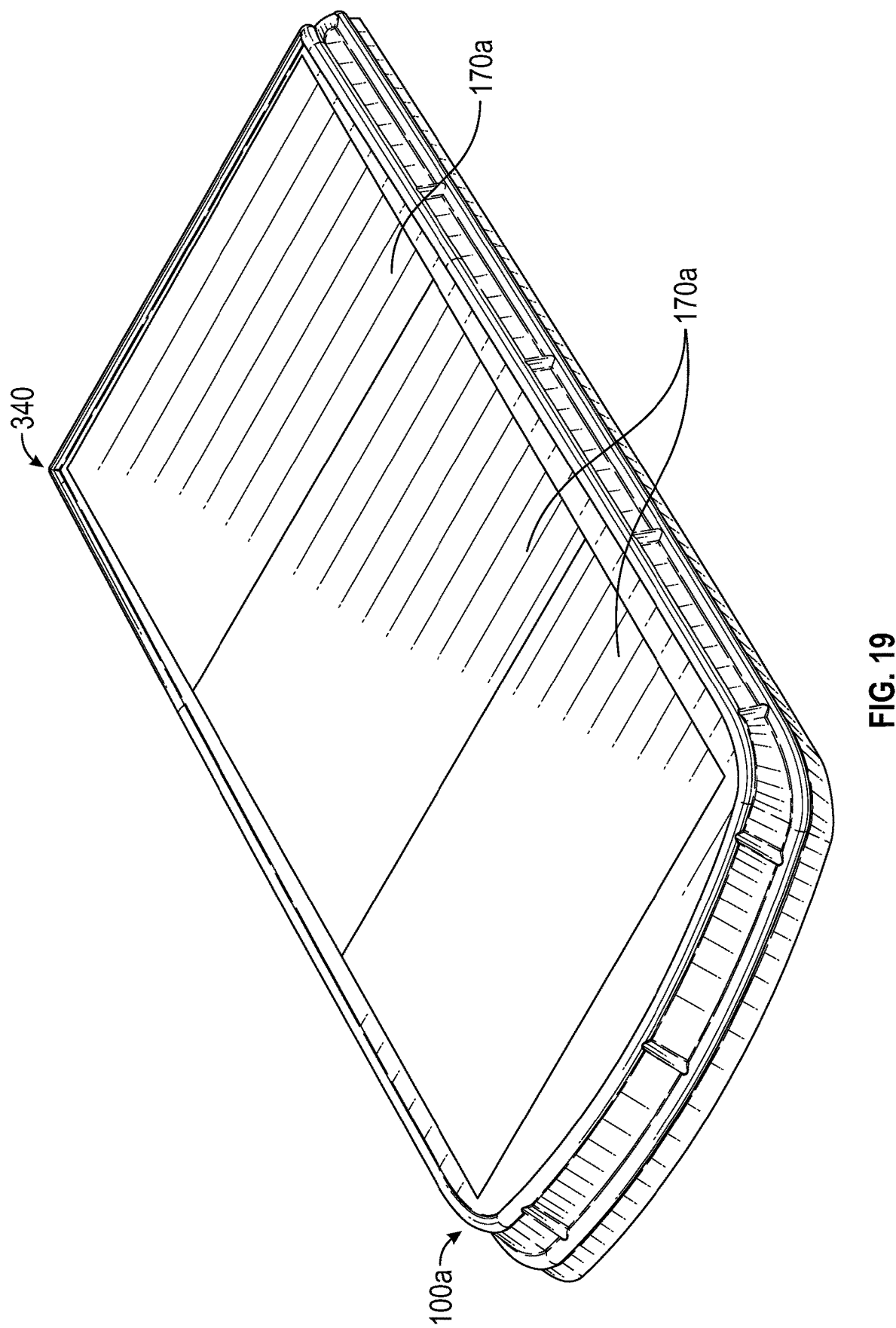
FIG. 19 is a perspective view of the rooftop tent frame and exterior assembly.
Figure 20:
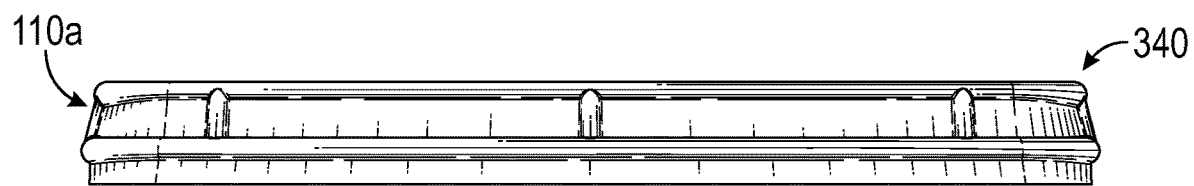
FIG. 20 is a front elevational view of the rooftop tent frame and exterior assembly.
Figure 21:
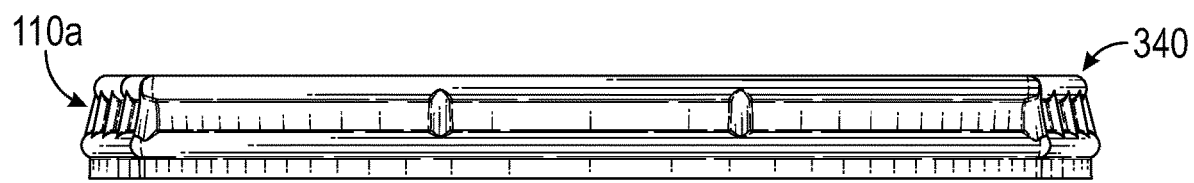
FIG. 21 is a rear elevational view of the rooftop tent frame and exterior assembly.
Figure 24:
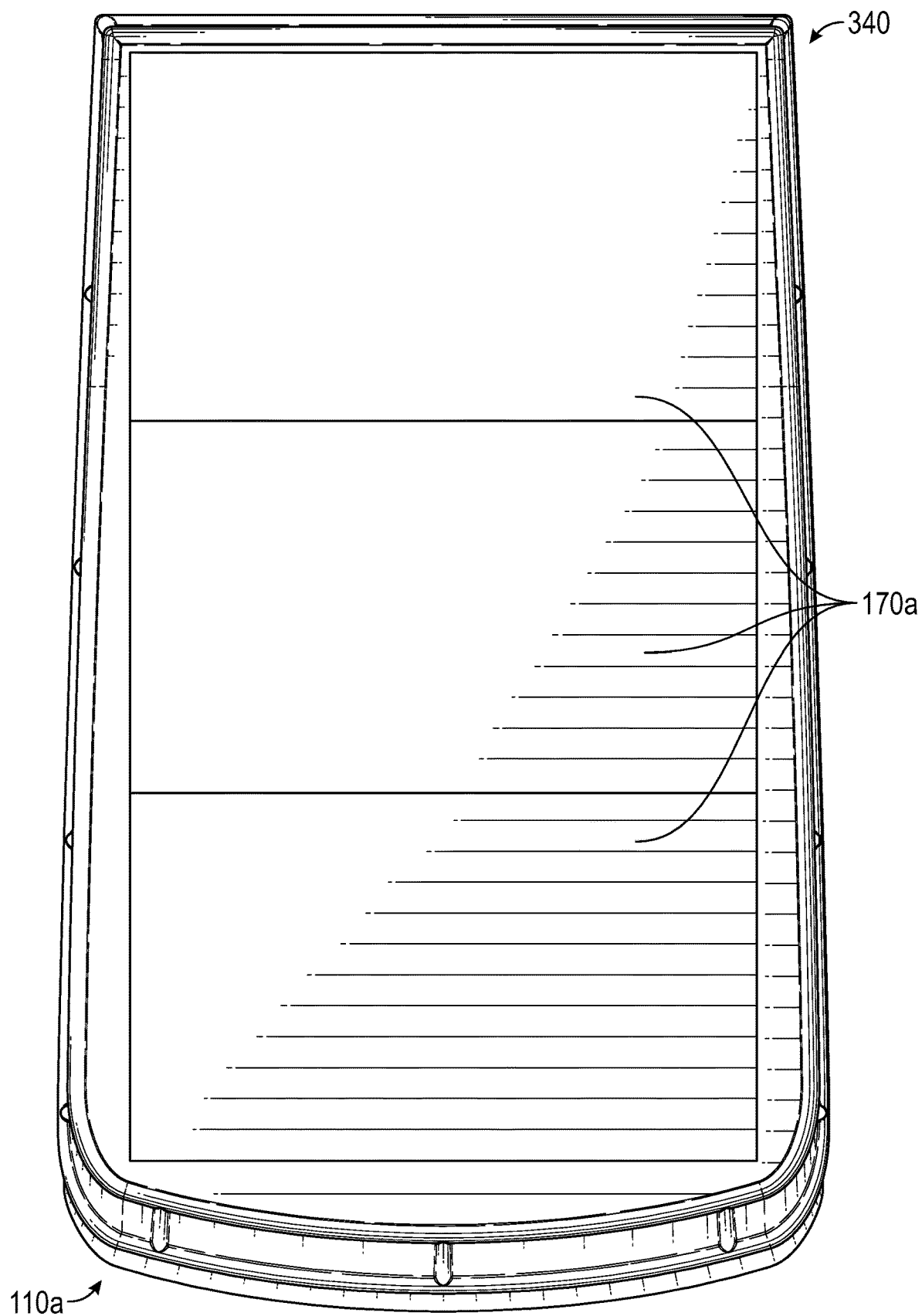
FIG. 24 is a top plan view of the rooftop tent frame and exterior assembly, with three modular roof panels (moon roof) that together make the roof.
Figure 25:
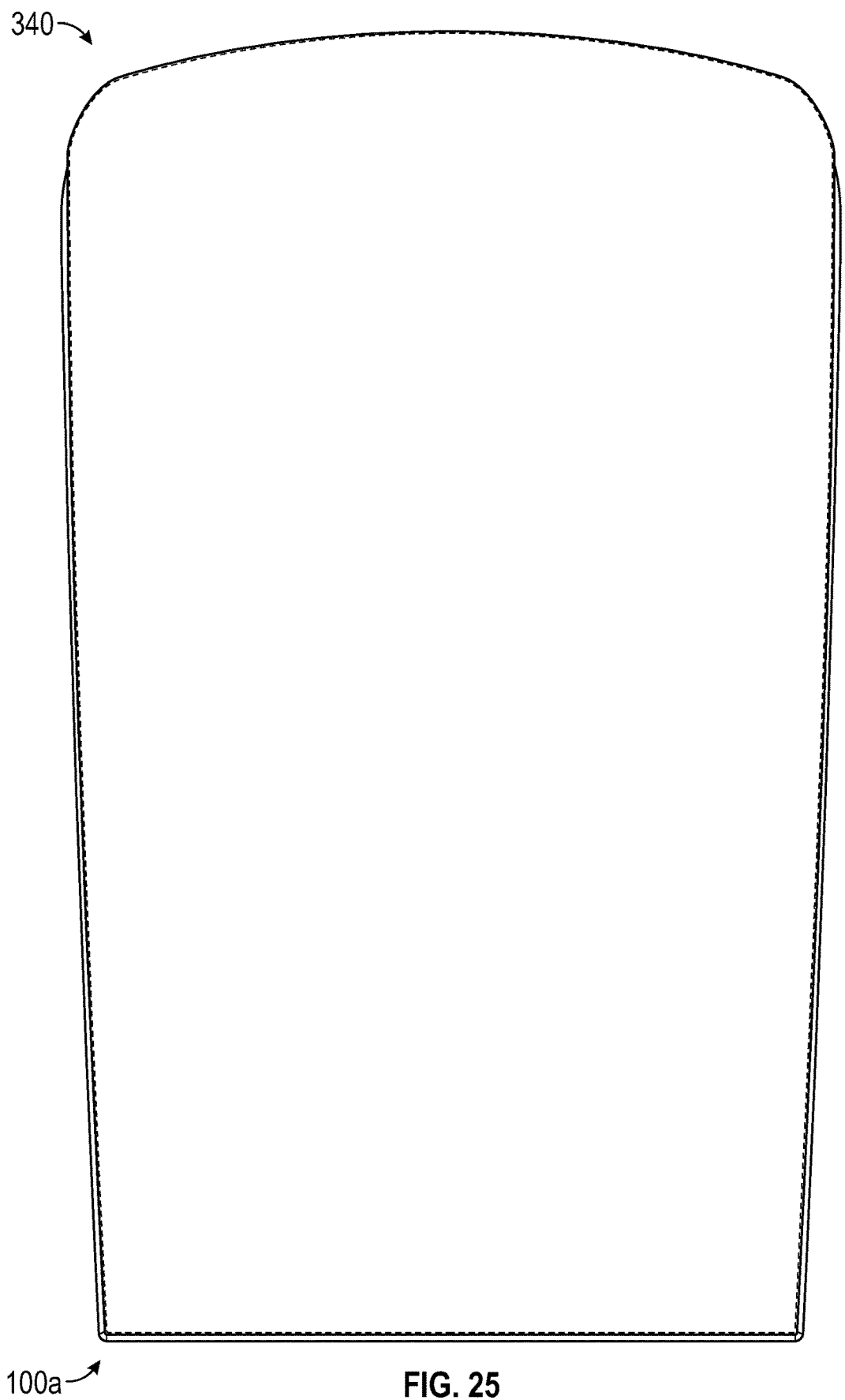
FIG. 25 is a bottom plan view of the rooftop tent frame and exterior assembly.
Figure 26:
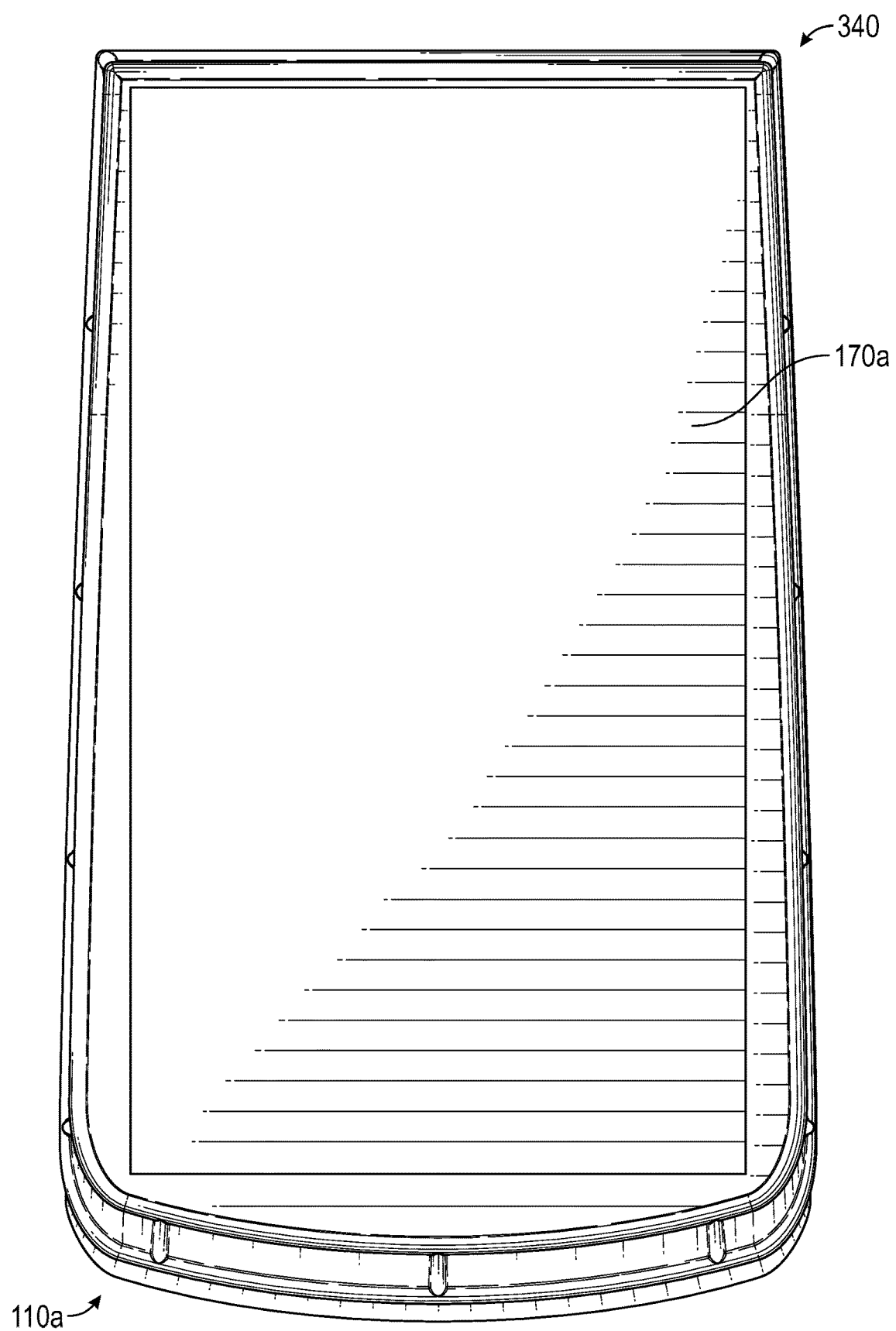
FIG. 26 is top plan view of another embodiment the rooftop tent frame and exterior assembly, the front elevational view, the rear elevation view, the left side elevational view, the right side elevational view and the bottom plan view being the same as shown in FIGS. 20-23 and 25, with a single modular roof panel (moon roof) that makes the roof.
Figure 27:
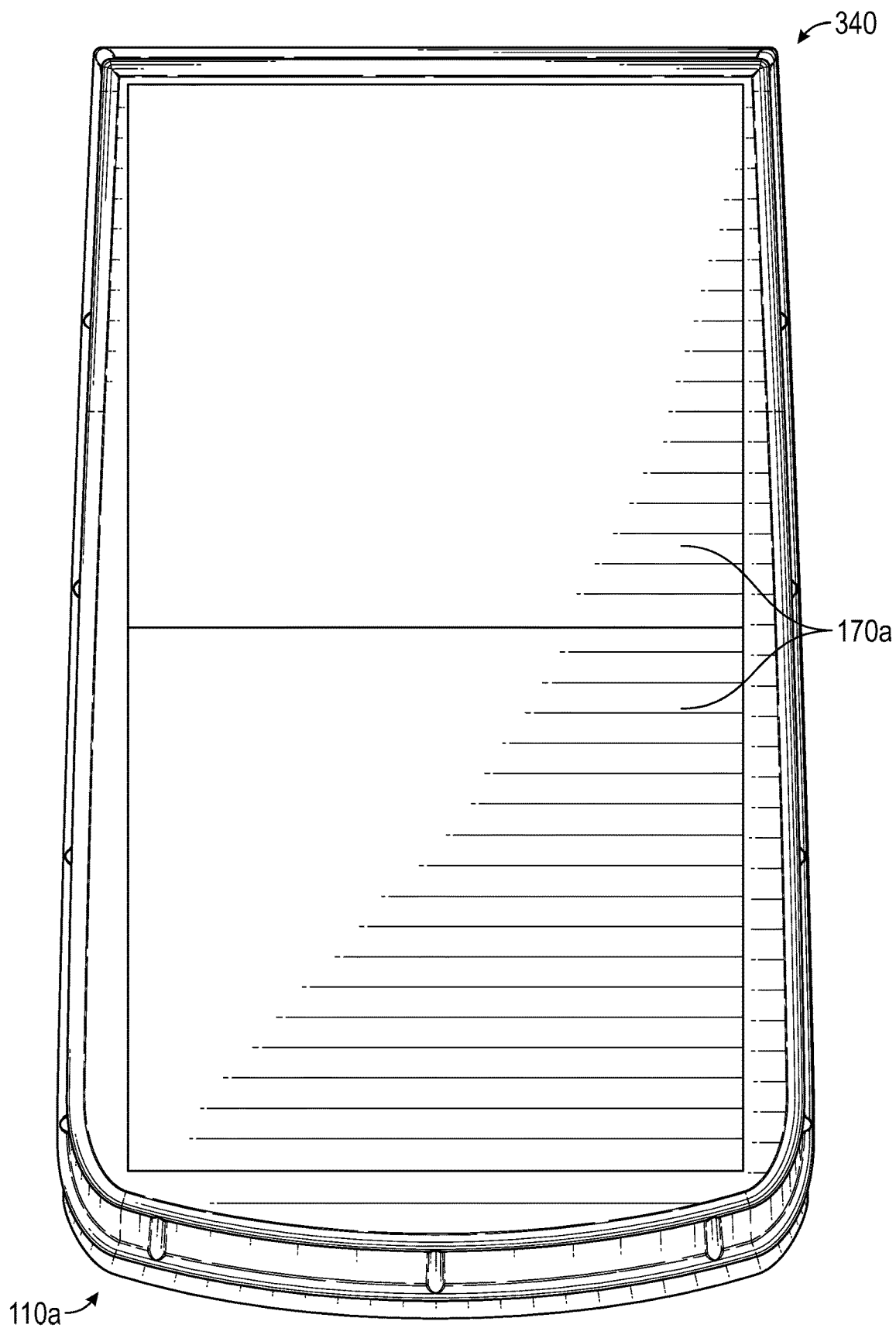
FIG. 27 is top plan view of a further embodiment the rooftop tent frame and exterior assembly, the front elevational view, the rear elevation view, the left side elevational view, the right side elevational view and the bottom plan view being the same as shown in FIGS. 20-23 and 25, with two modular roof panels (moon roof) that together make the roof.
Figure 28:
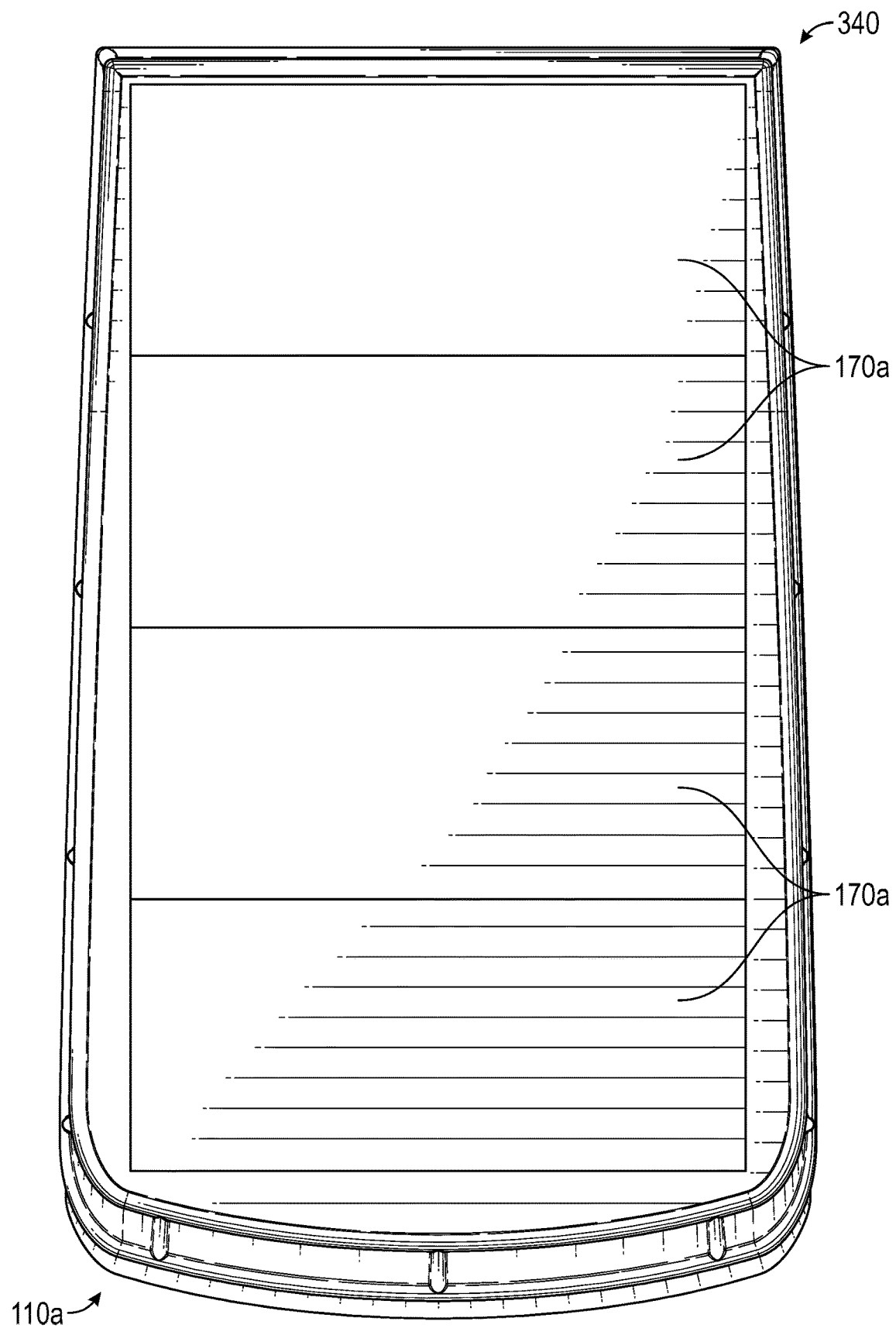
FIG. 28 is top plan view of a further embodiment the rooftop tent frame and exterior assembly, the front elevational view, the rear elevation view, the left side elevational view, the right side elevational view and the bottom plan view being the same as shown in FIGS. 20-23 and 25, with four modular roof panels (moon roof) that together make the roof.
Figure 29:
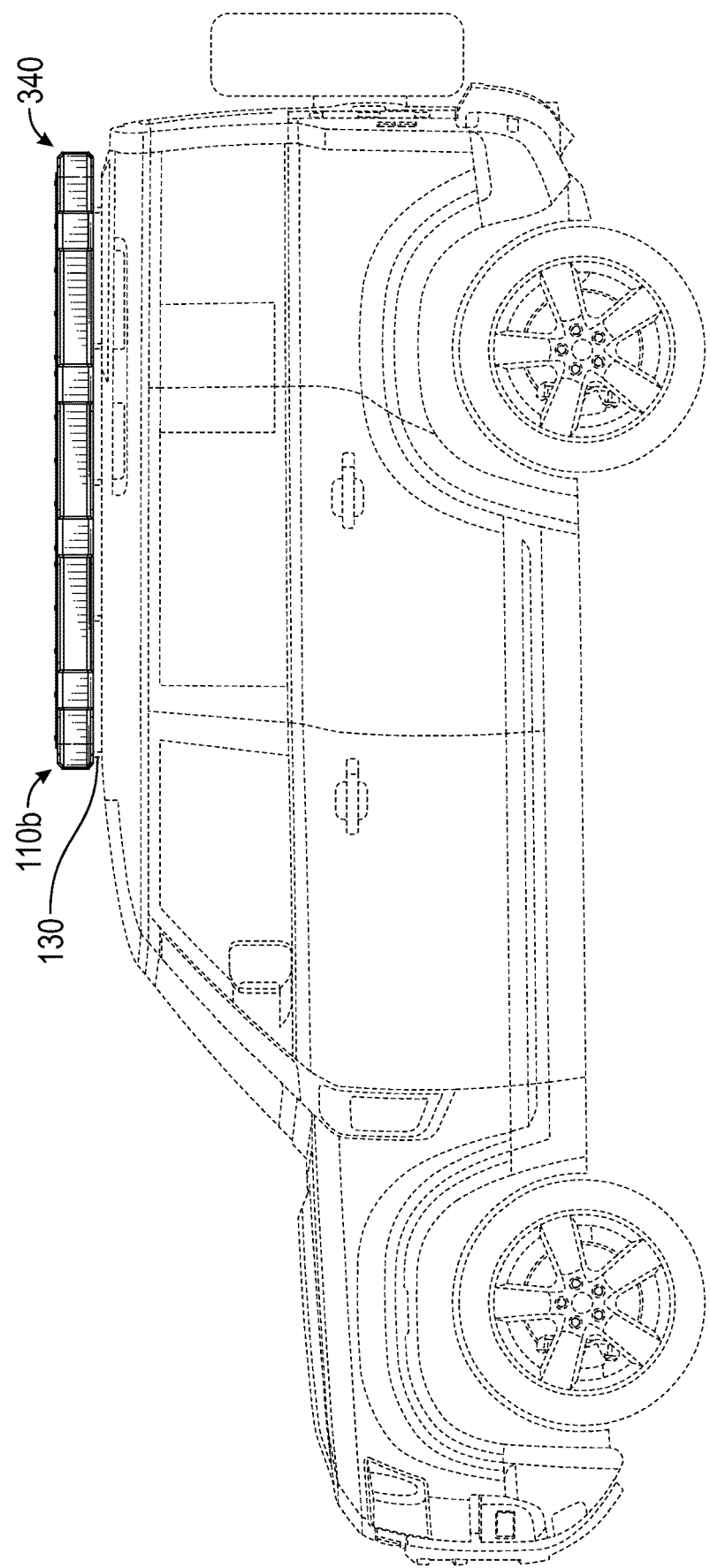
FIG. 29 is a side elevational view of another embodiment of a rooftop tent frame and exterior assembly shown on a vehicle, where the rooftop tent frame and exterior assembly is adjacent to, but not does not contact the roof.
Figure 30:
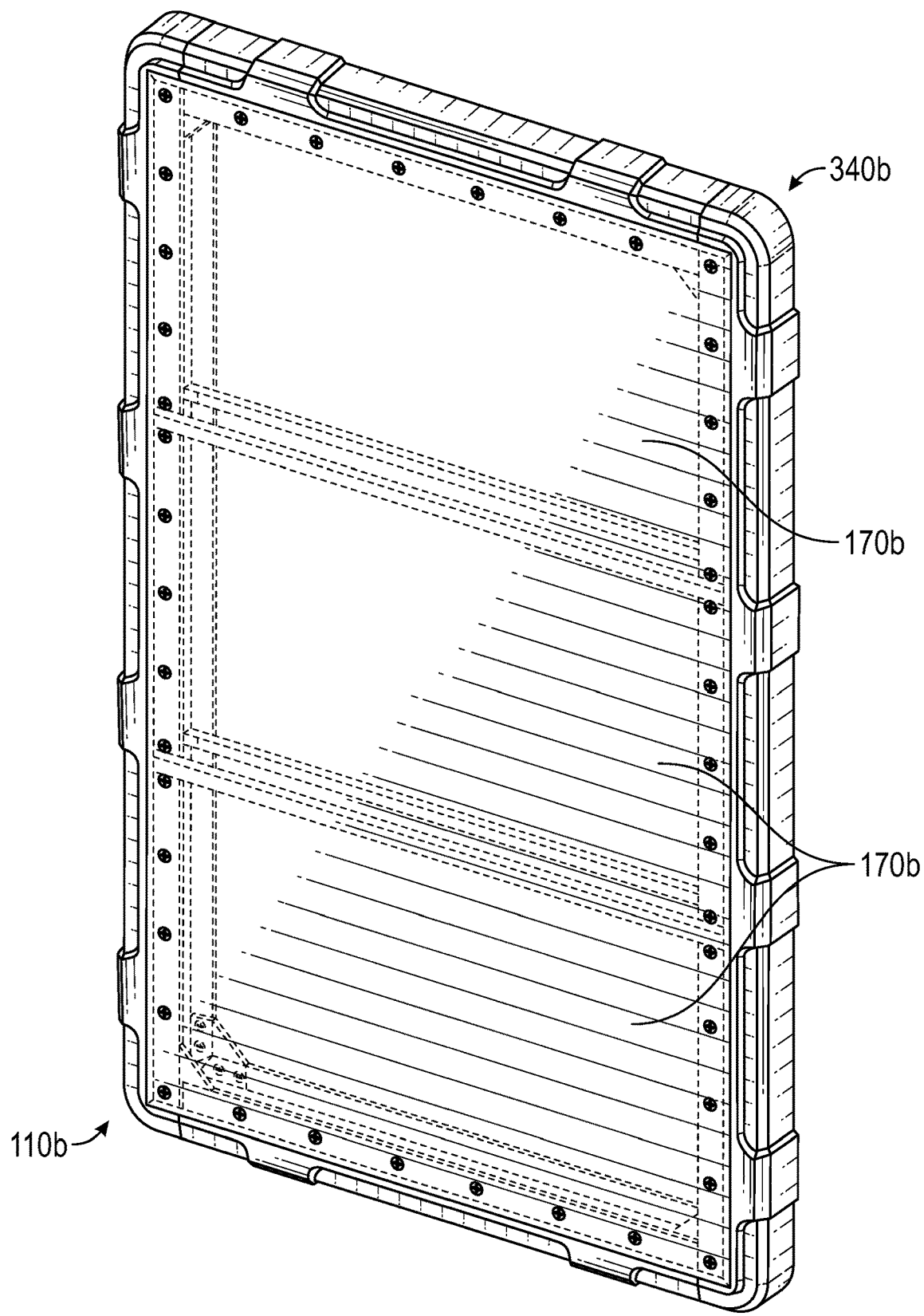
FIG. 30 is a top perspective view of the rooftop tent frame and exterior assembly of FIG. 29.
Figure 31:
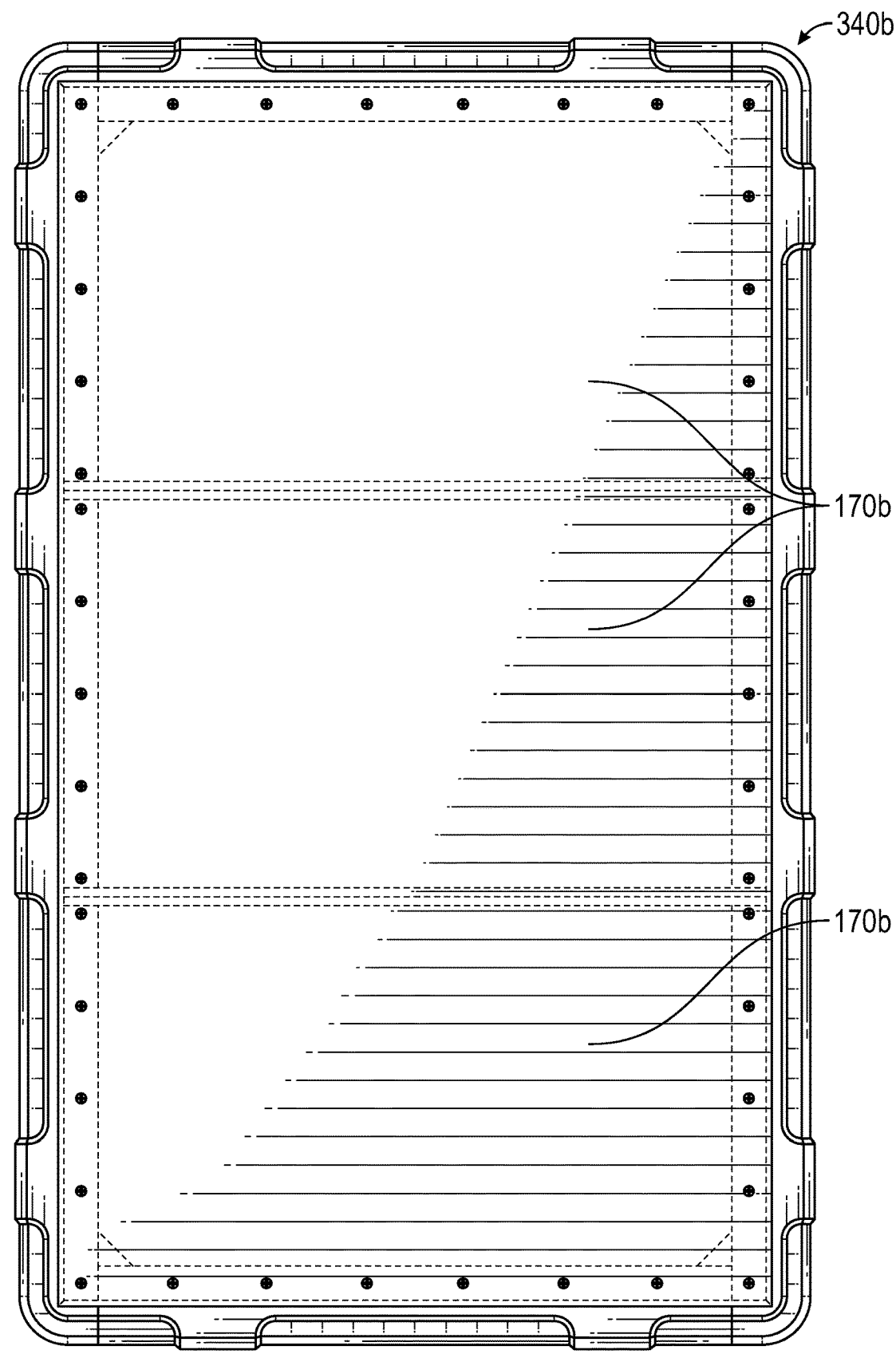
FIG. 31 is a top plan view of the rooftop tent frame and exterior assembly of FIG. 29.
Figure 32:
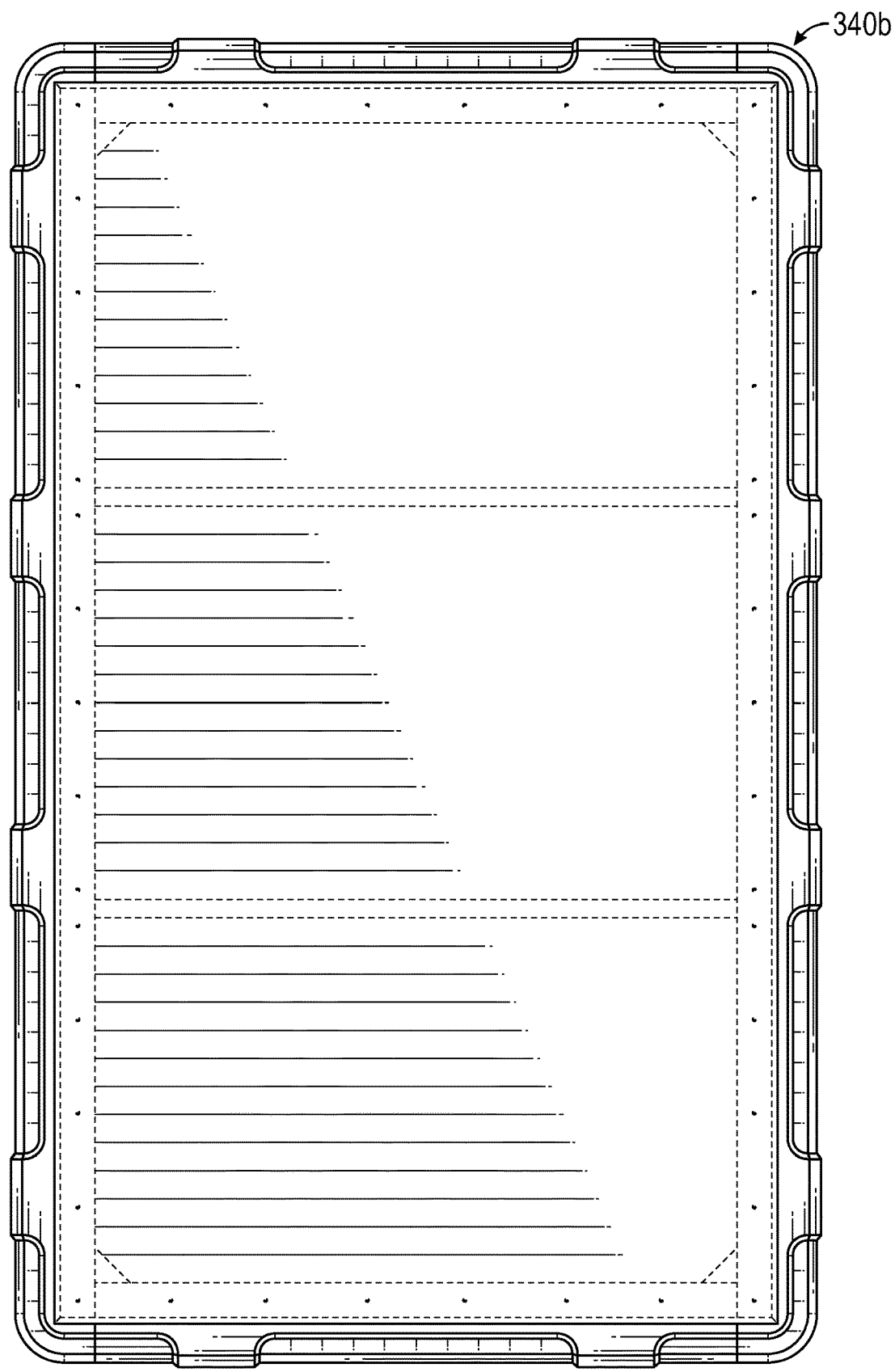
FIG. 32 is a bottom plan view of the rooftop tent frame and exterior assembly of FIG. 29.
Figure 33:
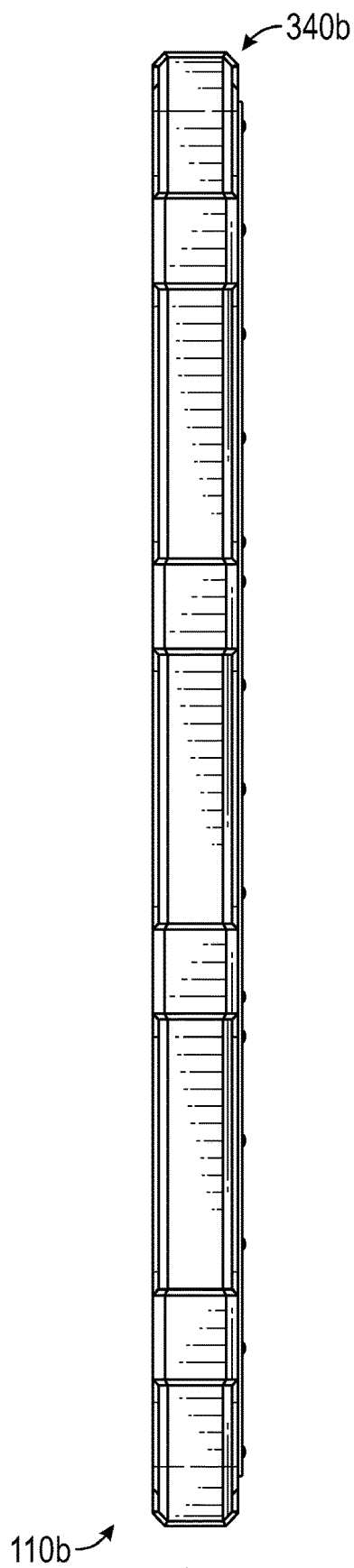
FIG. 33 is a left side elevational view of the rooftop tent frame and exterior assembly of FIG. 29.
Figure 34:
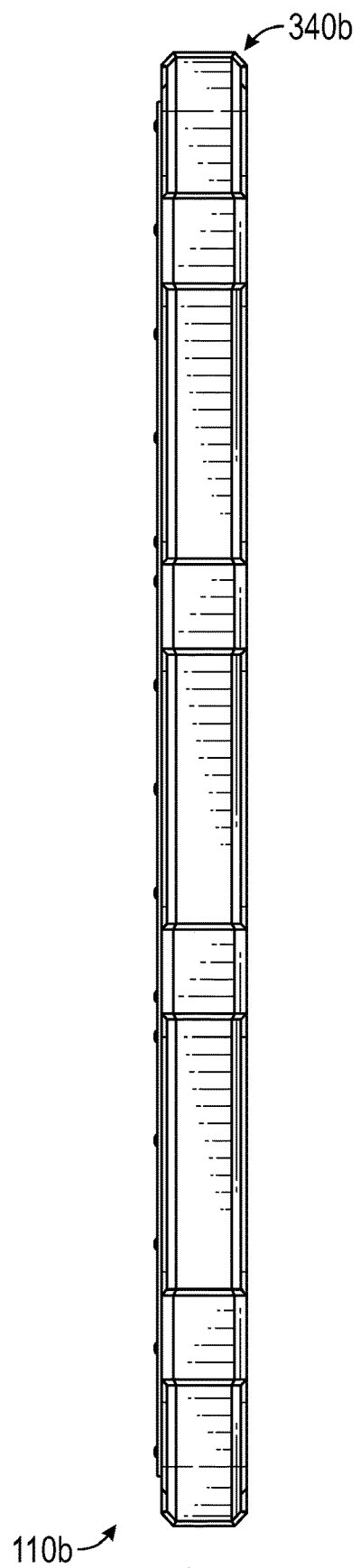
FIG. 34 is a right side elevational view of the rooftop tent frame and exterior assembly of FIG. 29.
Figure 35:
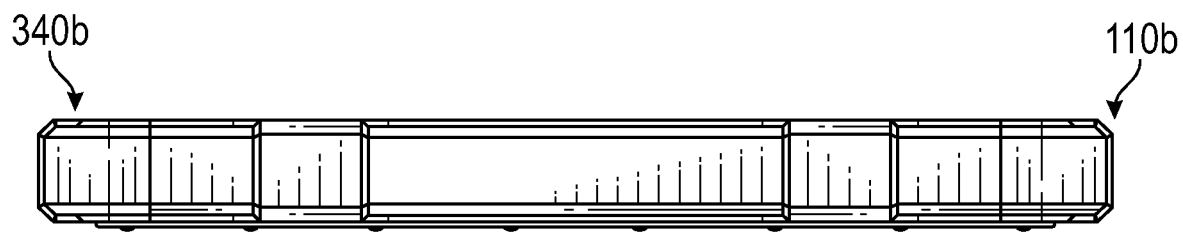
FIG. 35 is a rear elevational view of the rooftop tent frame and exterior assembly of FIG. 29.
Figure 36:
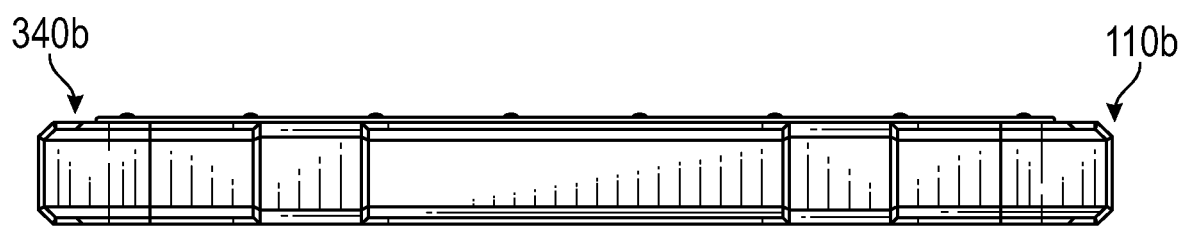
FIG. 36 is a front elevational view of the rooftop tent frame and exterior assembly of FIG. 29.
Figure 37:
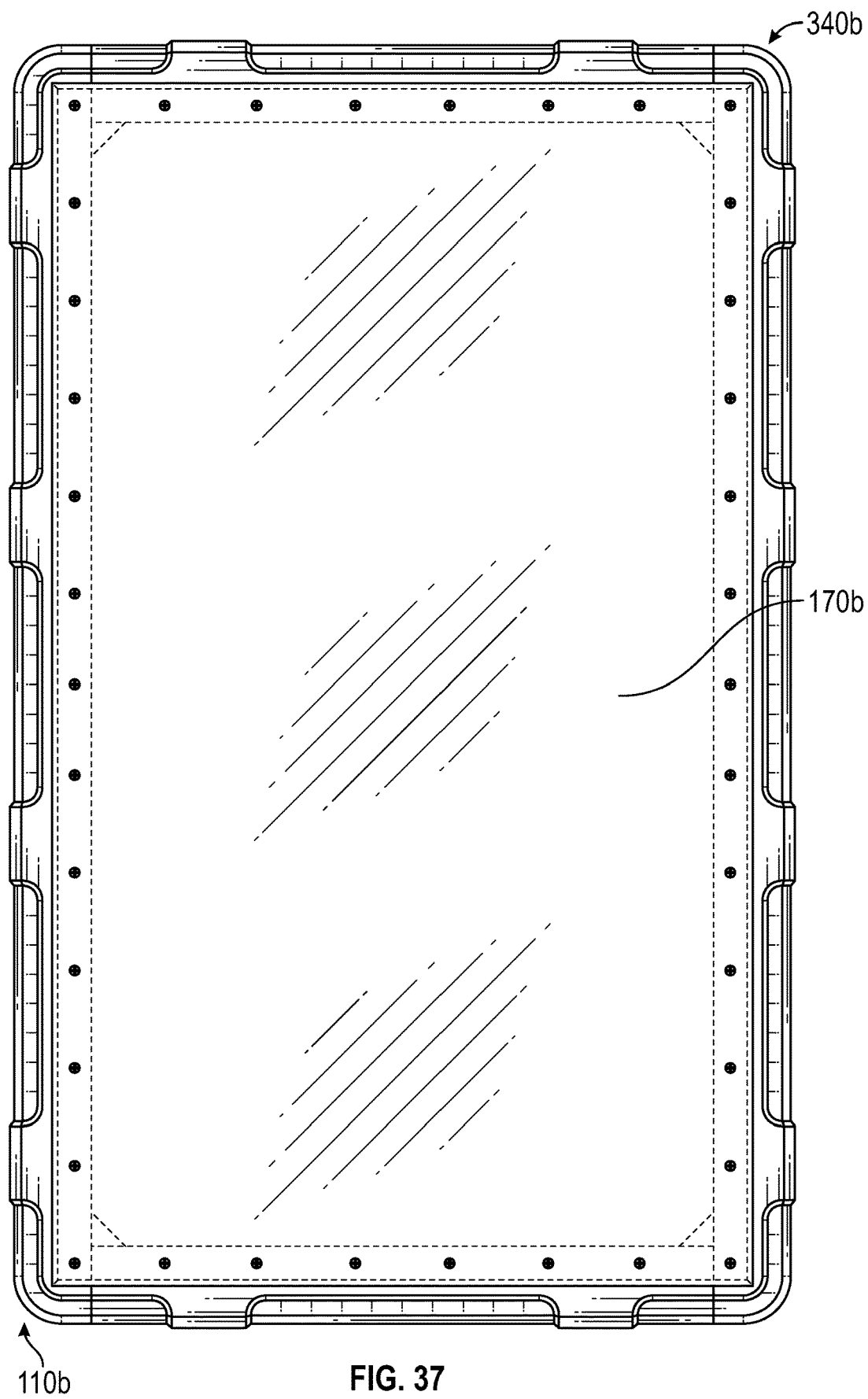
FIG. 37 is top plan view of another embodiment the rooftop tent frame and exterior assembly, the bottom plan view, the left side elevational view, the right side elevational view, the rear elevational view, and the front elevational view being the same as shown in FIGS. 32-36.
Figure 38:
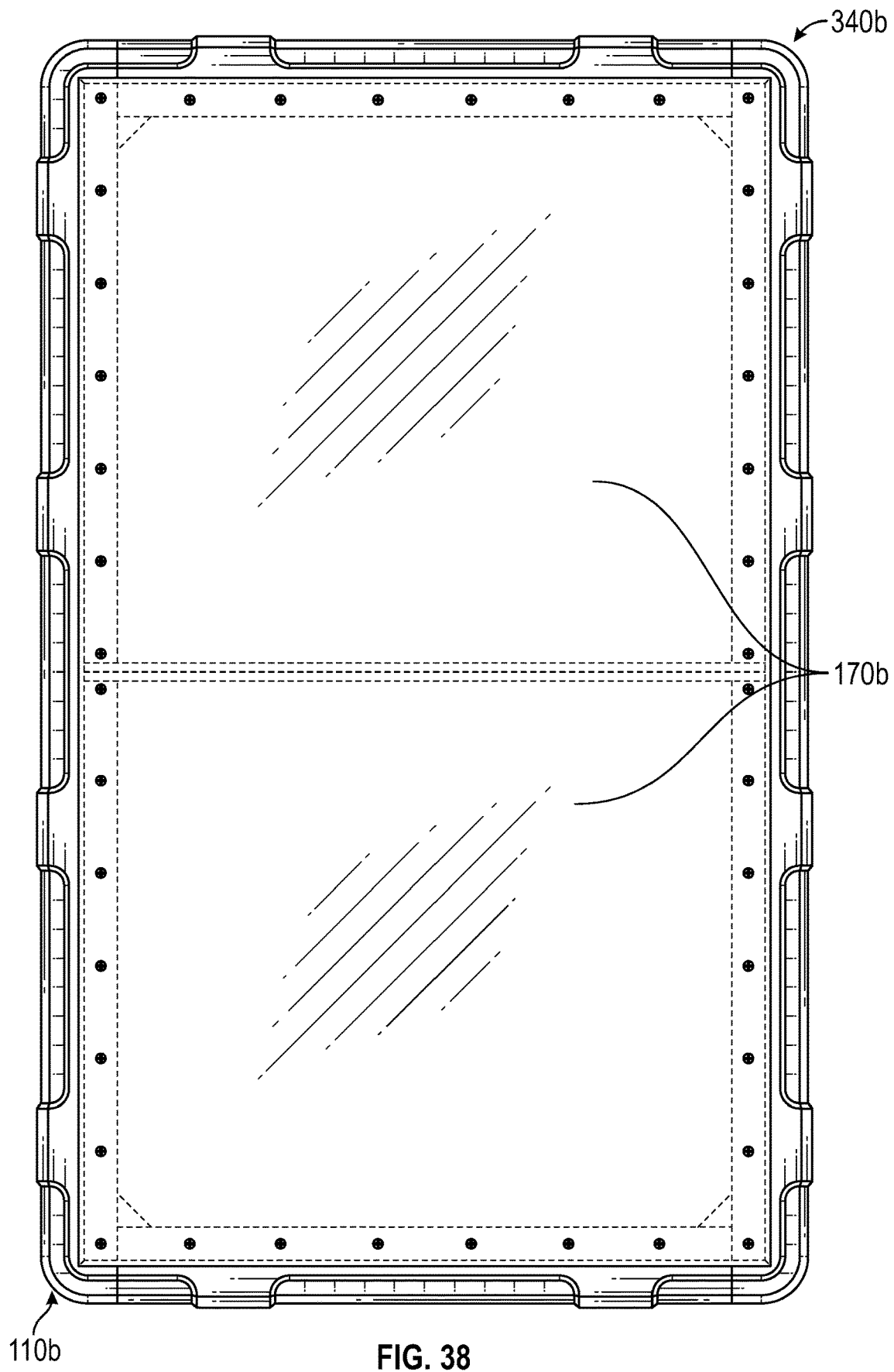
FIG. 38 is top plan view of a further embodiment the rooftop tent frame and exterior assembly, the bottom plan view, the left side elevational view, the right side elevational view, the rear elevational view, and the front elevational view being the same as shown in FIGS. 32-36.
Figure 39:
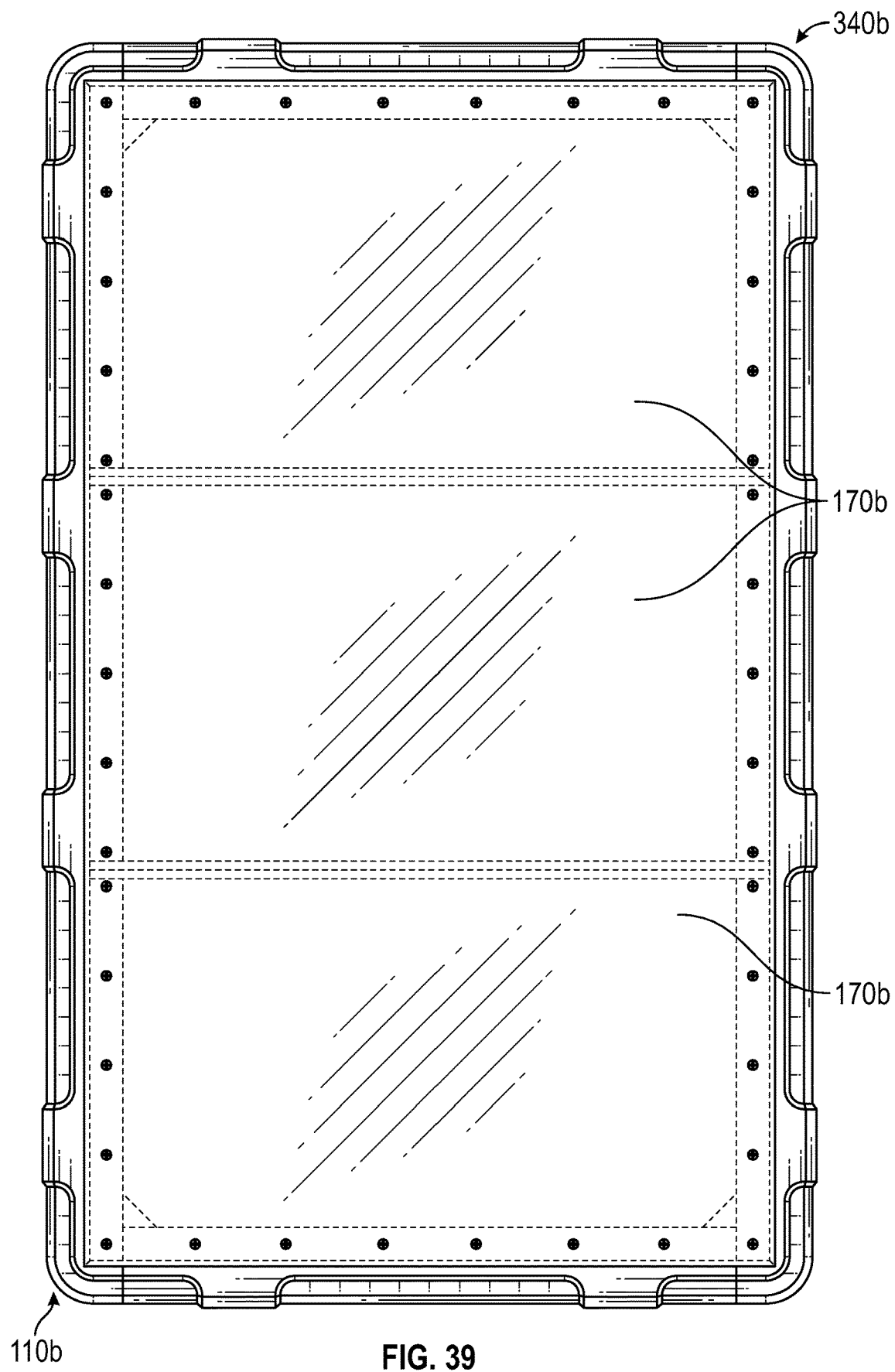
FIG. 39 is top plan view of a further embodiment the rooftop tent frame and exterior assembly, the bottom plan view, the left side elevational view, the right side elevational view, the rear elevational view, and the front elevational view being the same as shown in FIGS. 32-36.
Figure 40:
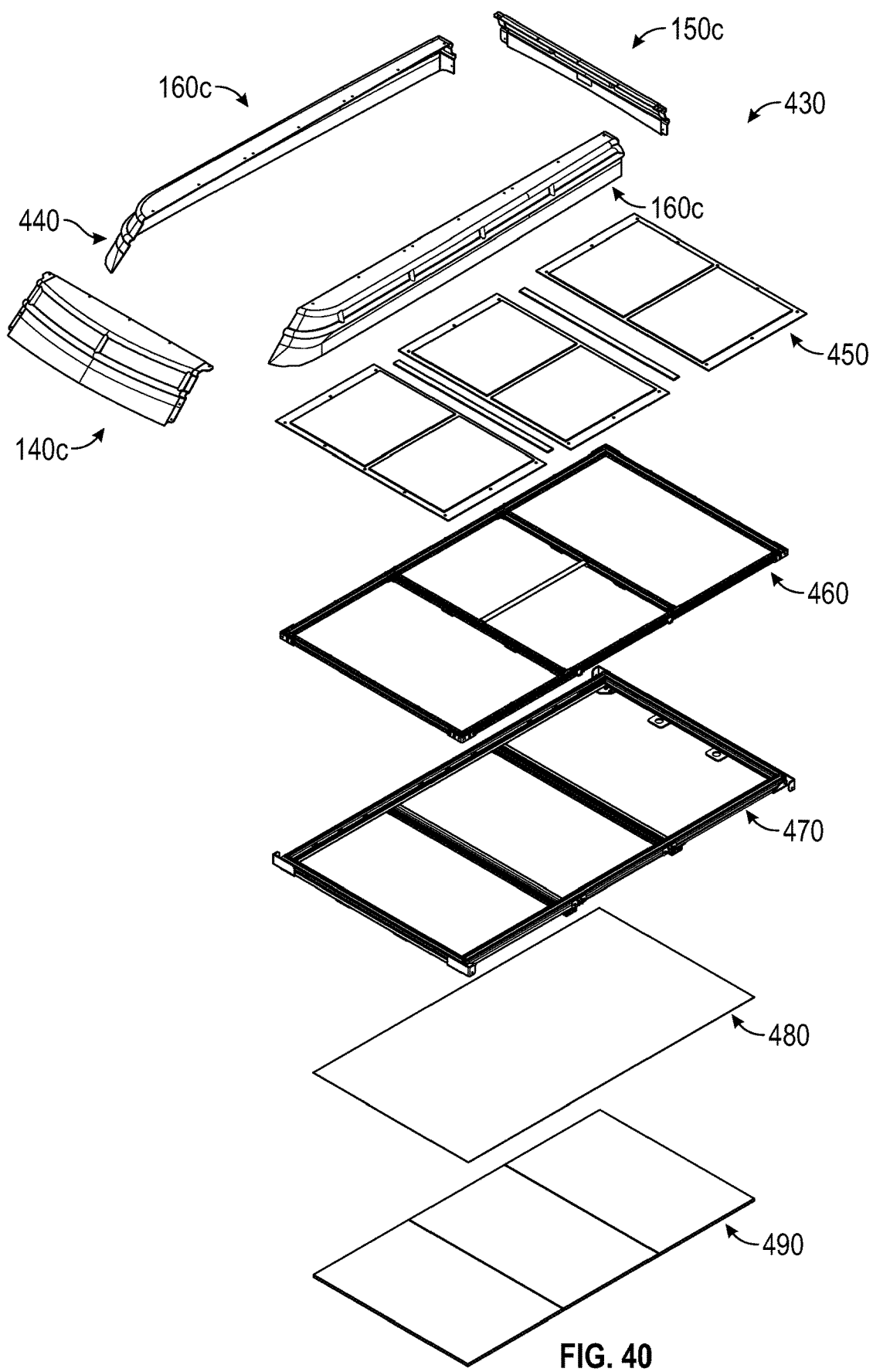
FIG. 40 is an exploded perspective view of another embodiment of a rooftop tent frame and exterior assembly.
Figure 41:
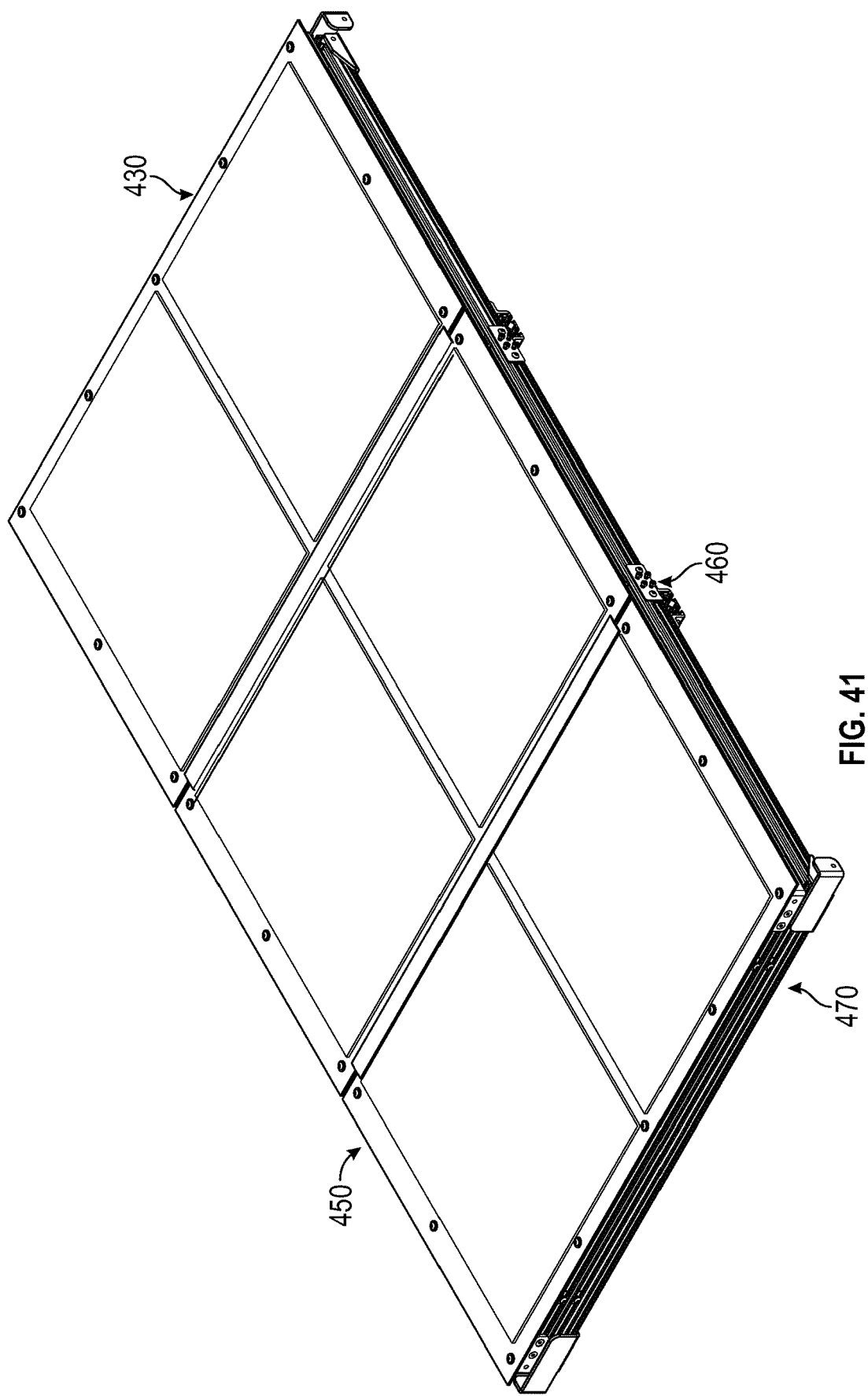
FIG. 41 is perspective view of the rooftop tent frame and exterior assembly of FIG. 40 with a front panel, a rear panel, and side panels of FIG. 40 shown removed.
Figure 42:
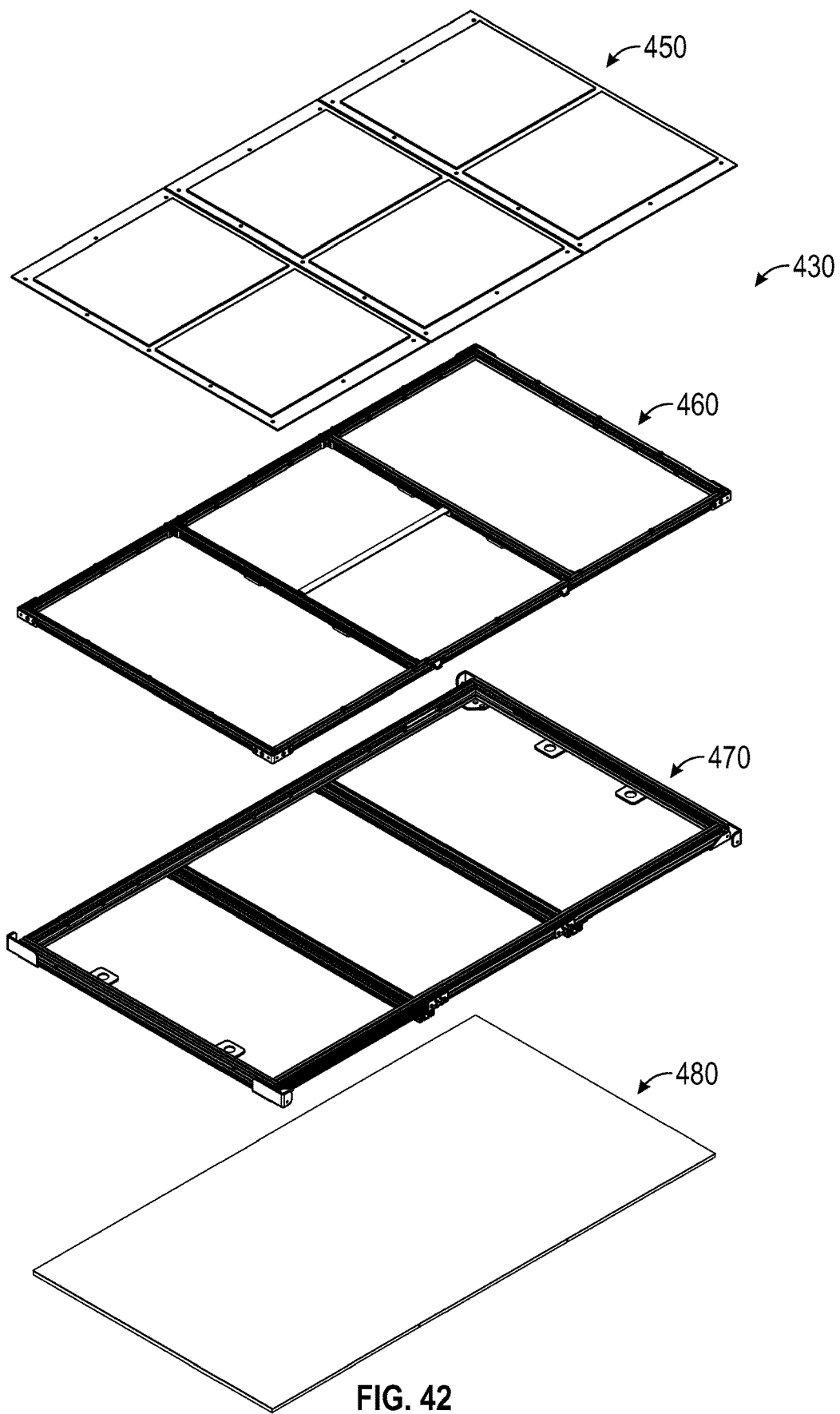
FIG. 42 is an exploded perspective view of a moon roof, top frame, bottom frame, and flooring of the rooftop tent frame and exterior assembly of FIG. 40.

With reference to FIGS. 2-6, an embodiment of a rooftop tent frame and exterior assembly 100 for a rooftop (and/or truck bed) tent of a vehicle will be described. The rooftop tent frame and exterior assembly 100 has a slim aerodynamic design that matches a roof line 110 of a vehicle 120 without modification to or removal of a roof 130 and when closed does not necessarily have an appearance of a hardshell tent. For example, as shown in FIGS. 2-6, the rooftop tent frame and exterior assembly 100 may have the appearance of a roof rack. The rooftop tent frame and exterior assembly 100 may be installed or removed without modification to or removal of the roof 130 of the vehicle 120. The rooftop tent frame and exterior assembly 100 may incorporate a standard soft tent wall version panned and/or a hard wall version. When the rooftop tent frame and exterior assembly 100 is mounted on the rooftop and when the rooftop tent frame and exterior assembly 100 is closed, the rooftop tent frame and exterior assembly 100 is in direct contact with the roof 130, there is no air gap between bottom of rooftop tent frame and exterior assembly 100/tent and the roof 130 of the vehicle 120, as there is with the prior art rooftop tent frame and exterior assembly and/or rooftop tent shown in FIG. 1. The rooftop tent frame and exterior assembly 100 has the general look of a classic roof rack, is quick to set up, and its aerodynamic low-profile design (no greater than 5 inches in height) enables the rooftop tent frame and exterior assembly 100 on the vehicle to fit in most garages, and reduce wind noise and poor gas mileage while on the road. The rooftop tent frame and exterior assembly 100 fits most vehicles via crossbar rails on the roof 130, or can be fitted with crossbar rails on the roof 130 or on a truck bed rack.

The rooftop tent frame and exterior assembly 100 includes a front panel 140, a rear panel 150, side panels 160, and top panels 170 made of plastic, aluminum, composite, or fiberglass material that assemble on a frame that is in contact with the vehicle's roof 130, creating a seamless appearance that allows for better aerodynamics and styling specific to each application. For example, the rooftop tent frame and exterior assembly may look like the roof rails on one vehicle when closed, or the rooftop tent frame and exterior assembly may look like a roof rack on another vehicle when closed. The rooftop tent frame and exterior assembly 100 conceals the tent components seamlessly on the roof 130 of the vehicle 120.

The front panel 140 includes an aerodynamic downwardly angled curvilinear top 180 with a curved front edge 190 with joins to an aerodynamic downwardly angled curvilinear front 200. The front panel 140 includes top flange 210 and side flanges 220.

The rear panel 140 includes a top 230, a rear 240, and opposite tail-shaped end portions 250. The top 230 includes a top flange 260.

The side panels 160 have a substantially L-shaped cross section and each include a side 270 and a top 280. The top 280 includes a top flange 290.

One or more of the flanges 220, 260, 290 include a top panel receiving portion 300.

The top panels 170 are one or more (e.g., 1, 2, 3, 4, 5, 6, etc.) rigid translucent dark smoke panels (or one or more rigid translucent panels) forming a 4 ft×6 ft moonroof with optics grade transparency and impact resistance, and look like tinted glass, or clear plastic, made using clear ABS, acrylic, polycarbonate, PET, PET, PVC, etc. The top panels 170 include side edges 310 that are connected by elongated panel connectors 320, and end edges 330 that are received by the top panel receiving portions 300 of the one or more of the flanges 220, 260, 290.

Because the rooftop tent frame and exterior assembly 100 is a modular assembly, the modular components of the rooftop tent frame and exterior assemblies/tent described herein can be shipped by standard delivery/small parcel carriers (e.g., Fedex, UPS, etc.) in relatively small boxes (e.g., 12×12×76", 36×48×12") cost effectively. The sizes of the boxes are also much smaller than the rooftop tent frame and exterior assemblies and/or rooftop tents of the past, requiring much less warehouse storage space. Accordingly, the rooftop tent frame and exterior assembly 100 results in less expensive freight in, less expensive freight out, and less expensive storage cost. The modularity of the rooftop tent frame and exterior assembly 100 enables the creation of multiple custom applications that utilize assembly pieces from multiple kits reducing cost of goods sold and improving inventory control. The top panels 170 of the rooftop tent frame and exterior assembly 100 also form a hard-shell moon roof for the rooftop tent, enabling the user to see the stars when laying down in the tent.

FIGS. 7-17 illustrate an embodiment of a deployed vehicle rooftop tent 340 including a rooftop tent frame and exterior assembly 100a, which is similar to the rooftop tent frame and exterior assembly 100 shown and described herein (incorporated herein), but has a different external/peripheral design and is shown with different numbers of panels (e.g., three panels 170a (FIG. 13), one panel 170a (FIG. 15), two panels 170a (FIG. 16)). The vehicle rooftop tent 340 includes front tent/vestibule section 350 with large zip open window/screen with fine window mesh 360, side tent sections 370, 380 with large zip open window/screen with fine window mesh 390, and rear tent section 400 with large zip open window/screen with fine window mesh 410.

FIGS. 18-28 illustrate the vehicle rooftop tent 340 in a retracted/down condition with the rooftop tent frame and exterior assembly 100a concealing the rest of the tent 340 and with the rooftop tent frame and exterior assembly 100a in a low-profile configuration, in contact with the roof 130.

FIGS. 29-39 illustrate a vehicle rooftop tent 340b similar to the vehicle rooftop tent 340, but with a rugged rooftop tent frame and exterior assembly 100b shown in a retracted/down condition and concealing the rest of the tent 340b with the rugged rooftop tent frame and exterior assembly 100b in a low-profile configuration, and adjacent to, but not in contact with the roof 130. The rugged rooftop tent frame and exterior assembly 100b is shown with a variety of different numbers of panels 170b, which are similar to the panels 170, 170a. The rugged vehicle rooftop tent 340b/rooftop tent frame and exterior assembly 100b is designed to look like a tactical military use utility case on top the vehicle. The rugged vehicle rooftop tent 340b/rooftop tent frame and exterior assembly 100b has a clamshell design that tilts up at one end and offers a 270-degree view towards the back and a full 360-degree view with moonroof option.

With reference to FIGS. 40-45, another embodiment of a rooftop tent frame and exterior assembly 430 will be described. The rooftop tent frame and exterior assembly 430 is similar to the rooftop tent frame and exterior assembly 100 shown and described herein (and the description and advantages discussed above incorporated herein). Like elements of the rooftop tent frame and exterior assembly 100 will be identified with a similar reference number, but with a "c" suffix. The rooftop tent frame and exterior assembly 430 includes a shell/panel/cowling assembly 440 having a front panel 140c, a rear panel 150c, and side panels 160c, a moon roof assembly 450, a top frame assembly 460, a bottom frame assembly 470, moisture barrier 480, and floor panel 490. For clarity, vehicle rooftop tent section and tent strut/lift assembly with gas shock are not shown.

Figure 43:
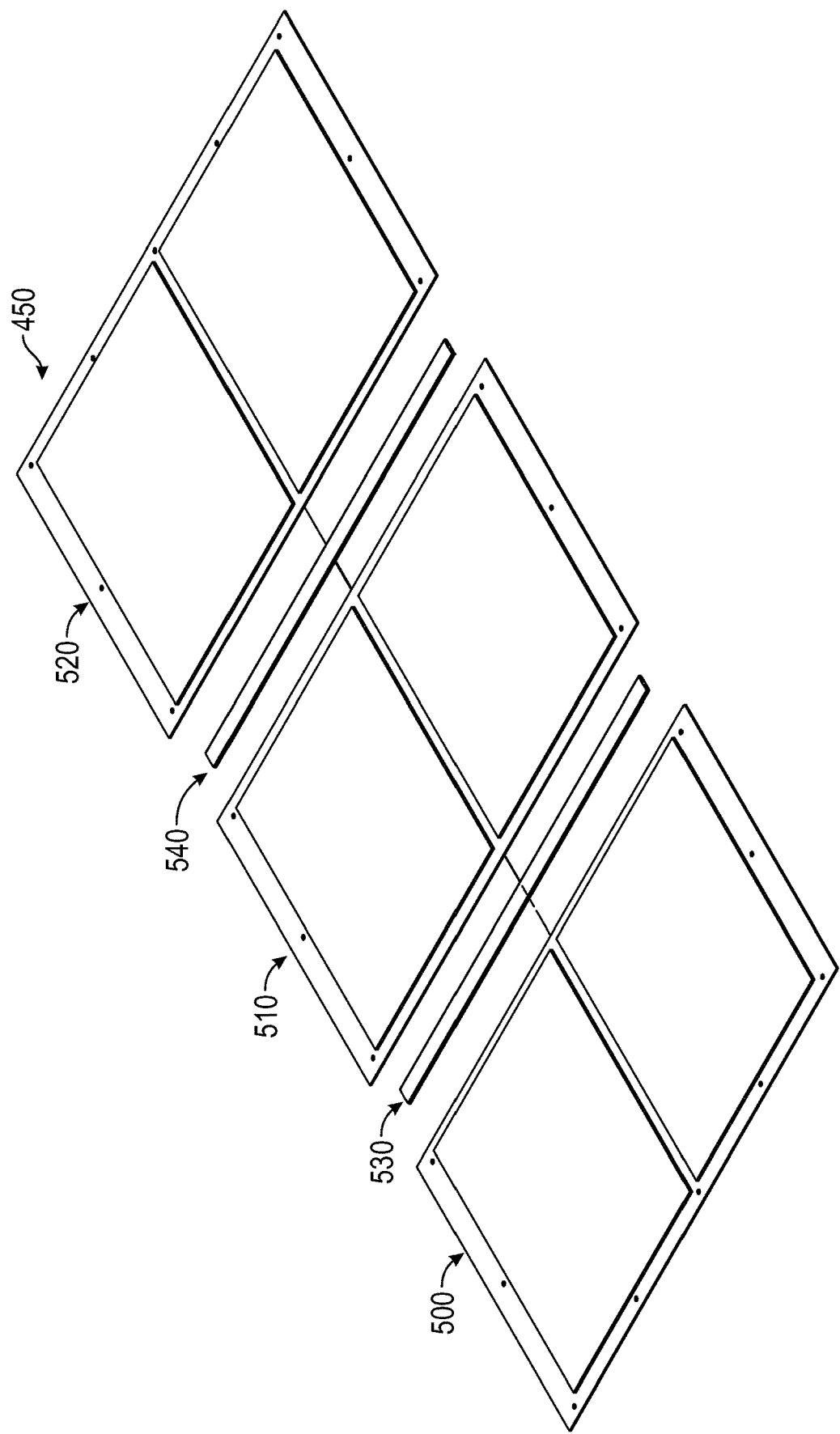
FIG. 43 is an exploded perspective view of the moon roof of the rooftop tent frame and exterior assembly of FIG. 40 water seals between panels.

With reference to FIG. 43, the moon roof assembly 450 includes three moon roof panel assemblies 500, 510, 520. Moon roof/water seals 530, 540 are disposed between the moon roof panel assemblies 500, 510, 520. As discussed above, the moon roof 450 may have other numbers of panels (e.g., one, two, four, five, etc.) than those shown in FIGS. 40-43.

Figure 44:
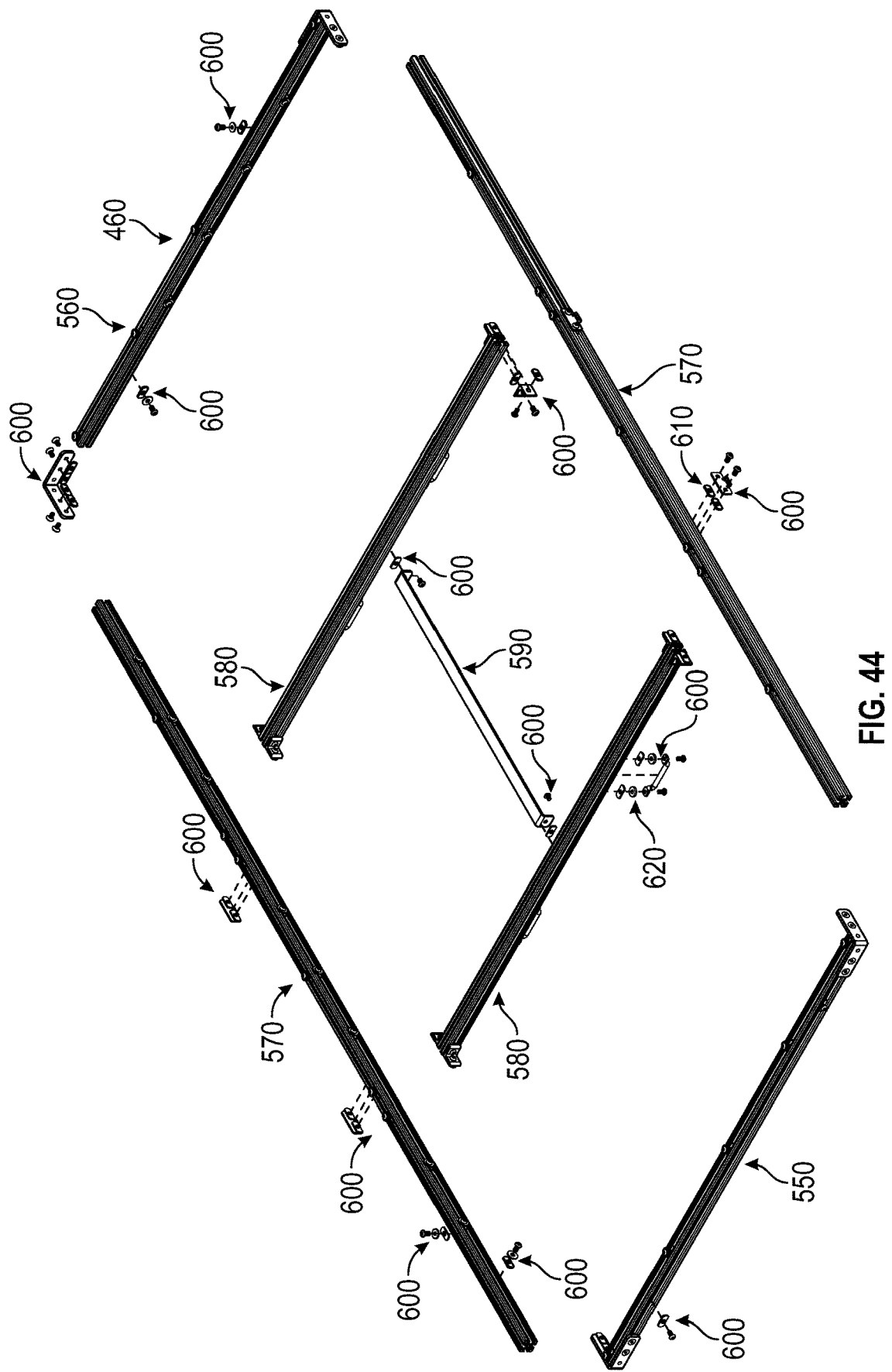
FIG. 44 is an exploded perspective view of the top frame of the rooftop tent frame and exterior assembly of FIG. 40.

With reference to FIG. 44, the top frame assembly 460, which supports the moon roof 450, includes a front frame 550, rear frame 560, side frames 570, crossbar frames 580, center support 590, various fasteners 600, latch member 610, pull down 620.

Figure 45:
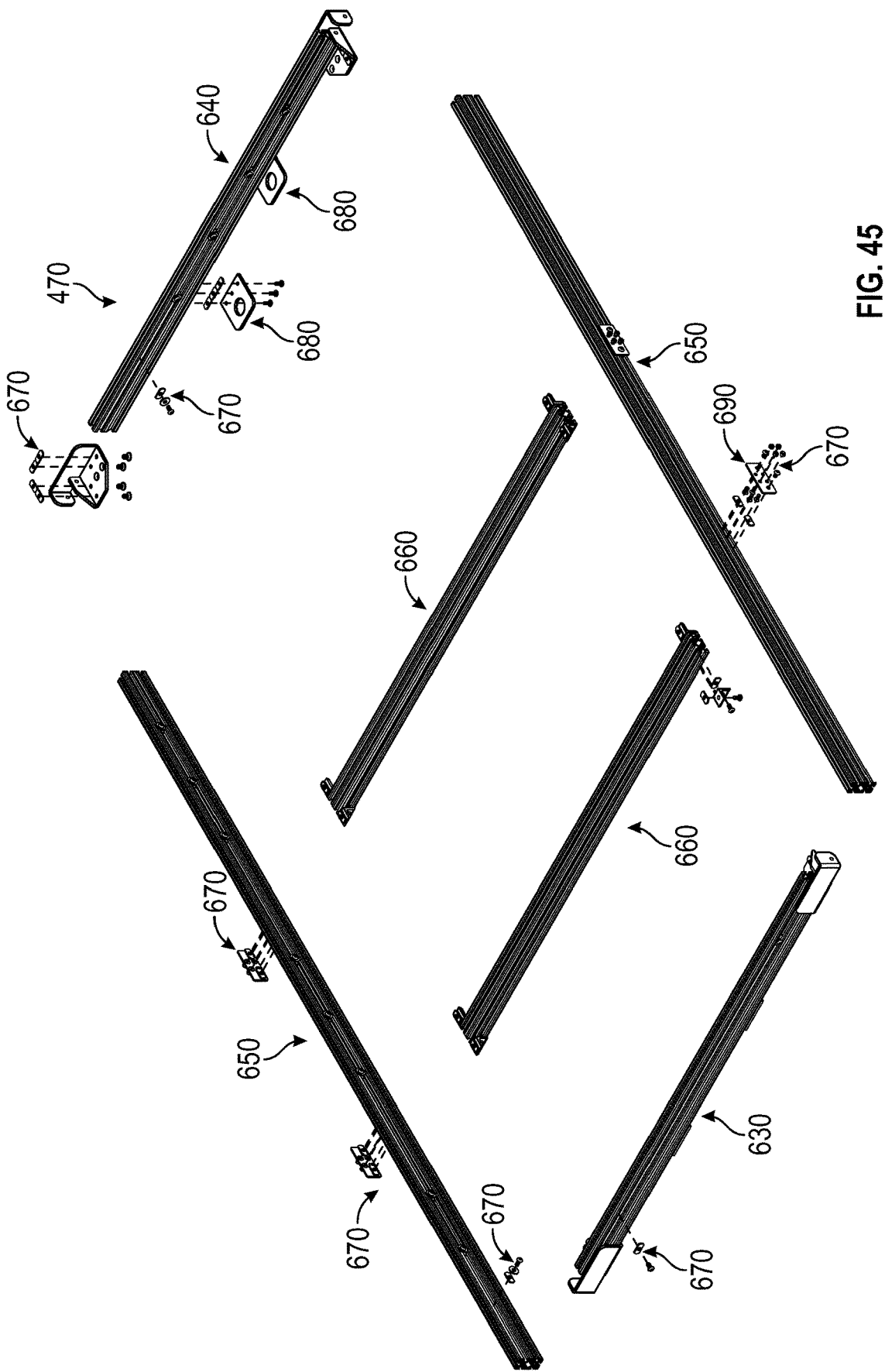
FIG. 45 is an exploded perspective view of the bottom frame of the rooftop tent frame and exterior assembly of FIG. 40.

With reference to FIG. 45, the bottom frame assembly 470, which supports flooring 480, includes a front frame 630, rear frame 640, side frames 650, floor support crossbar frames 660, various fasteners 670, floor support tabs 680, and latch member 690.

The rooftop tent frame and exterior assemblies are made of plastic, aluminum, composite, or fiberglass material with an aerodynamic design that matches the roof line of the vehicle without modification to nor removal of the roof and when closed does not appear to be a hard-shell tent. The rooftop tent frame and exterior assemblies may be installed or removed without modification to vehicle. The rooftop tent frame and exterior assemblies may incorporate a standard soft tent wall version panned and hard wall version. The rooftop tent frame and exterior assemblies assemble on a frame that is in contact with the vehicle's roof/roof line, creating a seamless appearance that allows for better aerodynamics and styling specific to each application. The rooftop tent frame and exterior assemblies conceal the tent components seamlessly on the roof of the vehicle. The top panels of the rooftop tent frame and exterior assemblies also form a hard-shell moon roof for the rooftop tent.

Because the rooftop tent frame and exterior assemblies shown and described herein are a modular assembly, the modular components of the rooftop tent frame and exterior assemblies described herein are shipped by standard shipping carriers in relatively small boxes (e.g., 12×12×76" 9 (no greater than 10,944 cubic inches), 36×48×12" (no greater than 20,736 cubic inches)) cost effectively. The sizes of the boxes are also much smaller than the rooftop tent frame and exterior assemblies and/or rooftop tents of the past, requiring much less warehouse storage space. Accordingly, the rooftop tent frame and exterior assemblies result in less expensive freight in, less expensive freight out, and less expensive storage cost. The modularity of the rooftop tent frame and exterior assemblies enable the creation of multiple custom applications that utilize assembly pieces from multiple kits reducing cost of goods sold and improving inventory control. Accordingly, an aspect of the invention involves a method of transporting a rooftop tent frame and exterior assemblies to a customer comprising inserting all of the modular components of the rooftop tent frame and exterior assemblies into one or more relatively small boxes (e.g., one or more boxes equal or less in volume than 12×12×76" or 36×48×12"), shipping the one or more boxes with all of the modular components of the rooftop tent frame and exterior assemblies to the customer via a standard shipping/small parcel carrier (FedEx, UPS, DHL), receiving by the customer the one or more boxes with all of the modular components of the rooftop tent frame and exterior assembly from the standard/small parcel shipping carrier; and removing all of the modular components of the rooftop tent frame and exterior assembly from the one or more boxes by the customer.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of transporting a rooftop tent frame and exterior assembly for a rooftop or truck bed of a vehicle to a customer, comprising one or more frame assemblies; a roof supported by the one or more frame assemblies and positionable between a retracted position where the roof is adjacent to the rooftop of the vehicle, and a deployed camping position where at least part of the roof is elevated relative to the rooftop of the vehicle, wherein the one or more frame assemblies and the roof are modular components, comprising:
  inserting all of rooftop tent frame and exterior assembly including the modular components of the rooftop tent frame and exterior assembly into one or more shipping boxes, each no greater than 20,736 cubic inches in volume;
  shipping the one or more boxes with all of rooftop tent frame and exterior assembly including the modular components to the customer via a shipping carrier;
  positioning the roof in the retracted position where the roof is adjacent to the rooftop of the vehicle;
  positioning the roof in the deployed camping position where at least part of the roof is elevated relative to the rooftop of the vehicle during camping.

2. The method of claim 1, wherein the rooftop tent frame and exterior assembly has a slim aerodynamic design that matches a roof line of the vehicle without modification to or removal of the rooftop.

3. The method of claim 1, wherein the rooftop tent frame and exterior assembly includes one of a soft wall tent and a hard wall tent.

4. The method of claim 1, wherein the one or more frame assemblies include a top frame assembly that supports the roof.

5. The method of claim 1, wherein the rooftop tent frame and exterior assembly includes flooring and the one or more frame assemblies include a bottom frame assembly that supports the flooring.

6. The method of claim 1, further comprising, while lying on one's back under the moon roof, looking up through the roof.

7. A method of transporting a rooftop tent frame and exterior assembly for a rooftop or truck bed of a vehicle to a customer, comprising one or more frame assemblies; a roof supported by the one or more frame assemblies and positionable between a retracted position where the roof is adjacent to the rooftop of the vehicle, and a deployed camping position where at least part of the roof is elevated relative to the rooftop of the vehicle, wherein the one or more frame assemblies and the roof are modular components and the rooftop tent frame and exterior assembly includes one of a soft wall tent and a hard wall tent, comprising:
  inserting all of rooftop tent frame and exterior assembly including the modular components of the rooftop tent frame and exterior assembly into one or more shipping boxes, each no greater than 20,736 cubic inches in volume;
  shipping the one or more boxes with all of rooftop tent frame and exterior assembly including the modular components to the customer via a shipping carrier;
  receiving by the customer the one or more boxes with all of rooftop tent frame and exterior assembly including the modular components from the shipping carrier.

8. The method of claim 7, further comprising removing all of rooftop tent frame and exterior assembly including the modular components from the one or more boxes by the customer.

9. The method of claim 7, wherein the rooftop tent frame and exterior assembly has a slim aerodynamic design that matches a roof line of the vehicle without modification to or removal of the rooftop.

10. The method of claim 7, wherein the one or more frame assemblies include a top frame assembly that supports the roof.

11. The method of claim 7, wherein the rooftop tent frame and exterior assembly includes flooring and the one or more frame assemblies include a bottom frame assembly that supports the flooring.

12. The method of claim 7, further comprising:
  positioning the roof in the retracted position where the roof is adjacent to the rooftop of the vehicle;
  positioning the roof in the deployed camping position where at least part of the roof is elevated relative to the rooftop of the vehicle during camping.

13. The method of claim 12, further comprising, while lying on one's back under the roof, looking up through the roof.

* * * * *